(12) United States Patent
Brogardh et al.

(10) Patent No.: US 11,453,118 B2
(45) Date of Patent: Sep. 27, 2022

(54) INDUSTRIAL ROBOT ARM

(71) Applicant: COGNIBOTICS AB, Lund (SE)

(72) Inventors: Torgny Brogardh, Molndal (SE);
Adam Nilsson, Brooklyn, NY (US);
Klas Nilsson, Lund (SE)

(73) Assignee: COGNIBOTICS AB, Lund (SE)

( * ) Notice: Subject to any disclaimer, the term of this patent is extended or adjusted under 35 U.S.C. 154(b) by 200 days.

(21) Appl. No.: 16/957,216

(22) PCT Filed: Jan. 11, 2019

(86) PCT No.: PCT/EP2019/050611
§ 371 (c)(1),
(2) Date: Jun. 23, 2020

(87) PCT Pub. No.: WO2019/138025
PCT Pub. Date: Jul. 18, 2019

(65) Prior Publication Data
US 2020/0391374 A1 Dec. 17, 2020

(30) Foreign Application Priority Data
Jan. 15, 2018 (EP) .................................. 18151630

(51) Int. Cl.
*B25J 9/00* (2006.01)
*B25J 9/04* (2006.01)
(Continued)

(52) U.S. Cl.
CPC ............. *B25J 9/0072* (2013.01); *B25J 9/042* (2013.01); *B25J 9/102* (2013.01); *B25J 9/1065* (2013.01); *F16H 37/12* (2013.01)

(58) Field of Classification Search
CPC ... B25J 9/0072; B25J 9/042; B25J 9/06; B25J 9/1065
See application file for complete search history.

(56) References Cited

U.S. PATENT DOCUMENTS 5,219,266 A 6/1993 Reboulet et al.
6,301,988 B1 * 10/2001 Brogårdh .............. B25J 9/1065
74/490.03
(Continued)

FOREIGN PATENT DOCUMENTS

CN 101722515 A 6/2010
CN 103097087 A 5/2013
(Continued)

OTHER PUBLICATIONS

International Search Reporton corresponding PCT application (PCT/EP2019/050611) from International Searching Authority (EPO) dated Apr. 25, 2019.
(Continued)

*Primary Examiner* — Joseph Brown
(74) *Attorney, Agent, or Firm* — Klein, O'Neill & Singh, LLP

(57) ABSTRACT

A robot arm (500) for end-effector motion. The robot arm comprises a first actuator (4) and a first kinematic chain from the first actuator to an end-effector platform, which gives a first degree of freedom for positioning the end-effector platform. The robot arm also comprises a second actuator (5; 5b) and a second kinematic chain from the second actuator to the end-effector platform, which gives a second degree of freedom for positioning the end-effector platform. The robot arm further comprises a third actuator (6; 6b, 512) and a third kinematic chain from the third actuator (6; 6b) to the end-effector platform, which gives a third degree of freedom for positioning the end-effector platform. The robot arm also comprises a fourth actuator (50; 150) and a fourth kinematic chain configured to transmit a movement of the fourth actuator to a corresponding orientation axis (65) for an end-effector (28). The fourth kinematic chain comprises an orientation linkage (52, 57, 59; 202, 204, 207, 209; 284, 286; 251, 256, 258) mounted to the inner arm-assemblage via at
(Continued)

least one bearing (53, 55; 206), and an orientation transmission (64B, 64A, 216; 64C, 64D, 64E; 100, 64A; 281, 279, 275; 260, 262, 264, 266, 271, 270) mounted to the end-effector platform, wherein the orientation linkage comprises an end-effector rotation link (59; 209; 258; 281) and joints (58, 60; 208, 210; 257, 259; 257, 259; 282, 280) that provide at least two degrees of freedom for each end joint of the end-effector rotation link.

22 Claims, 20 Drawing Sheets

(51) Int. Cl.
*B25J 9/10* (2006.01)
*F16H 37/12* (2006.01)

(56) References Cited

U.S. PATENT DOCUMENTS

| | | | | |
|---|---|---|---|---|
| 6,336,374 | B1* | 1/2002 | Brogardh | B25J 9/1065 74/490.03 |
| 6,425,303 | B1* | 7/2002 | Brogårdh | B25J 17/0283 248/278.1 |
| 6,540,471 | B1* | 4/2003 | Brogårdh | B25J 9/1065 414/917 |
| 6,723,106 | B1* | 4/2004 | Charles | B25J 9/1065 606/130 |
| 2004/0013509 | A1 | 1/2004 | Roy et al. | |
| 2004/0054438 | A1* | 3/2004 | Brogårdh | B23Q 1/5462 700/245 |
| 2004/0103739 | A1* | 6/2004 | Brogårdh | B23Q 1/5462 74/490.01 |
| 2005/0172750 | A1* | 8/2005 | Kock | B25J 9/107 74/490.01 |
| 2016/0089776 | A1* | 3/2016 | Brogardh | B25J 9/009 901/14 |
| 2017/0050312 | A1* | 2/2017 | Brogårdh | B25J 9/0072 |

FOREIGN PATENT DOCUMENTS

| | | | | |
|---|---|---|---|---|
| CN | 105121100 | A | | 12/2015 |
| CN | 106378771 | A | | 2/2017 |
| CN | 107127743 | A | | 9/2017 |
| CN | 206839459 | U | | 1/2018 |
| EP | 0149672 | B1 | | 7/1991 |
| EP | 1594661 | | | 11/2005 |
| EP | 2999572 | | | 3/2016 |
| EP | 3838499 | A1 * | | 6/2021 ............ B25J 9/0072 |
| FR | 2670424 | | | 4/1993 |
| FR | 2739801 | A1 * | | 4/1997 .............. B25J 9/106 |
| SE | 521584 | C2 * | | 11/2003 .............. B25J 11/00 |
| TW | 412467 | B  * | | 11/2000 |
| WO | WO1987003528 | | | 6/1987 |
| WO | WO-03078111 | A1 * | | 9/2003 ......... B23K 26/0884 |
| WO | WO-2004056538 | A1 * | | 7/2004 .......... B23Q 1/5462 |
| WO | WO2014187486 | | | 11/2014 |
| WO | WO2015188843 | | | 12/2015 |
| WO | WO-2021032680 | A1 * | | 2/2021 ............ B25J 9/0039 |

OTHER PUBLICATIONS

Written Opinion on corresponding PCT application (PCT/ EP2019/ 050611) from International Searching Authority (EPO) dated Apr. 25, 2019.

* cited by examiner

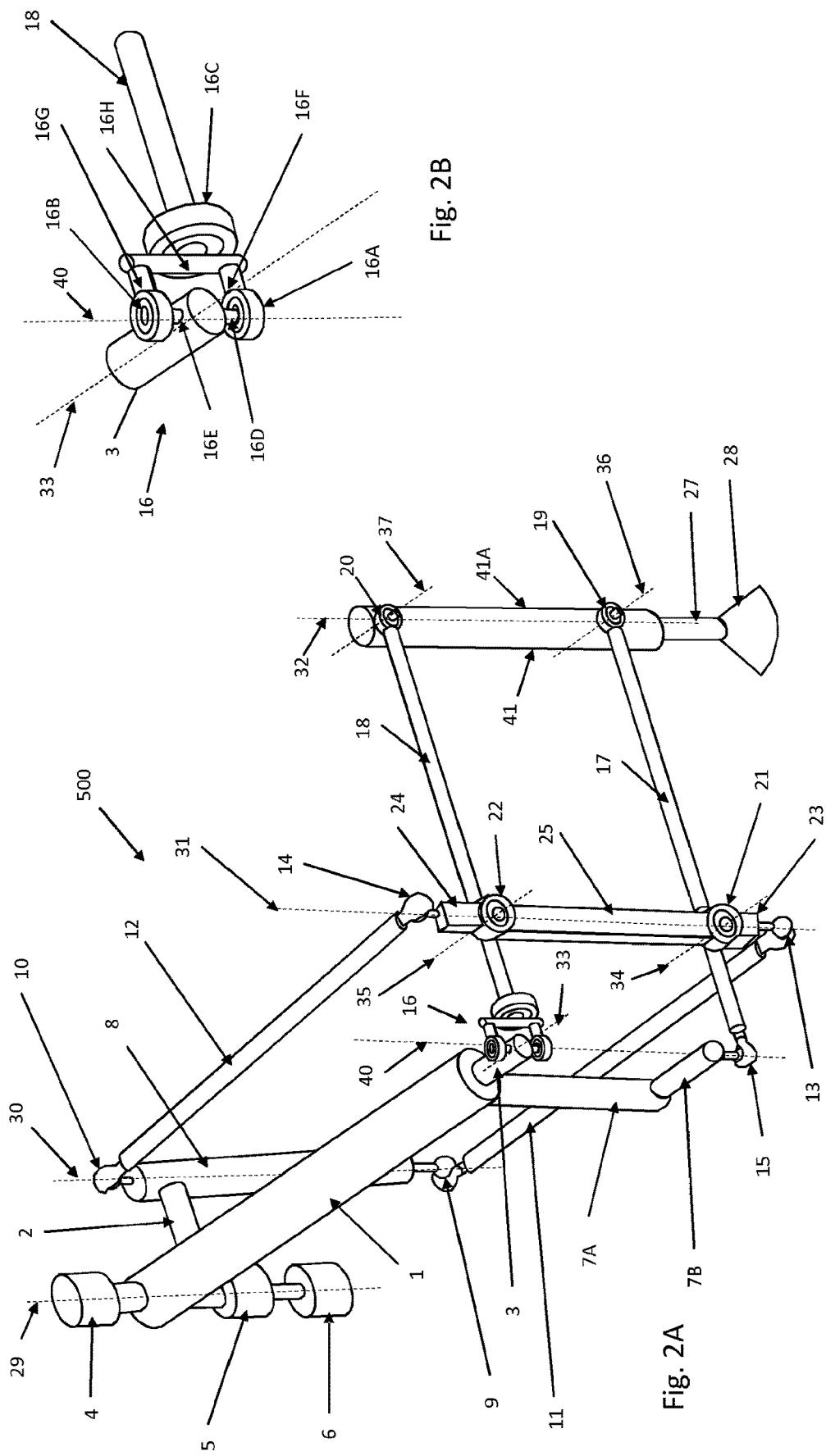

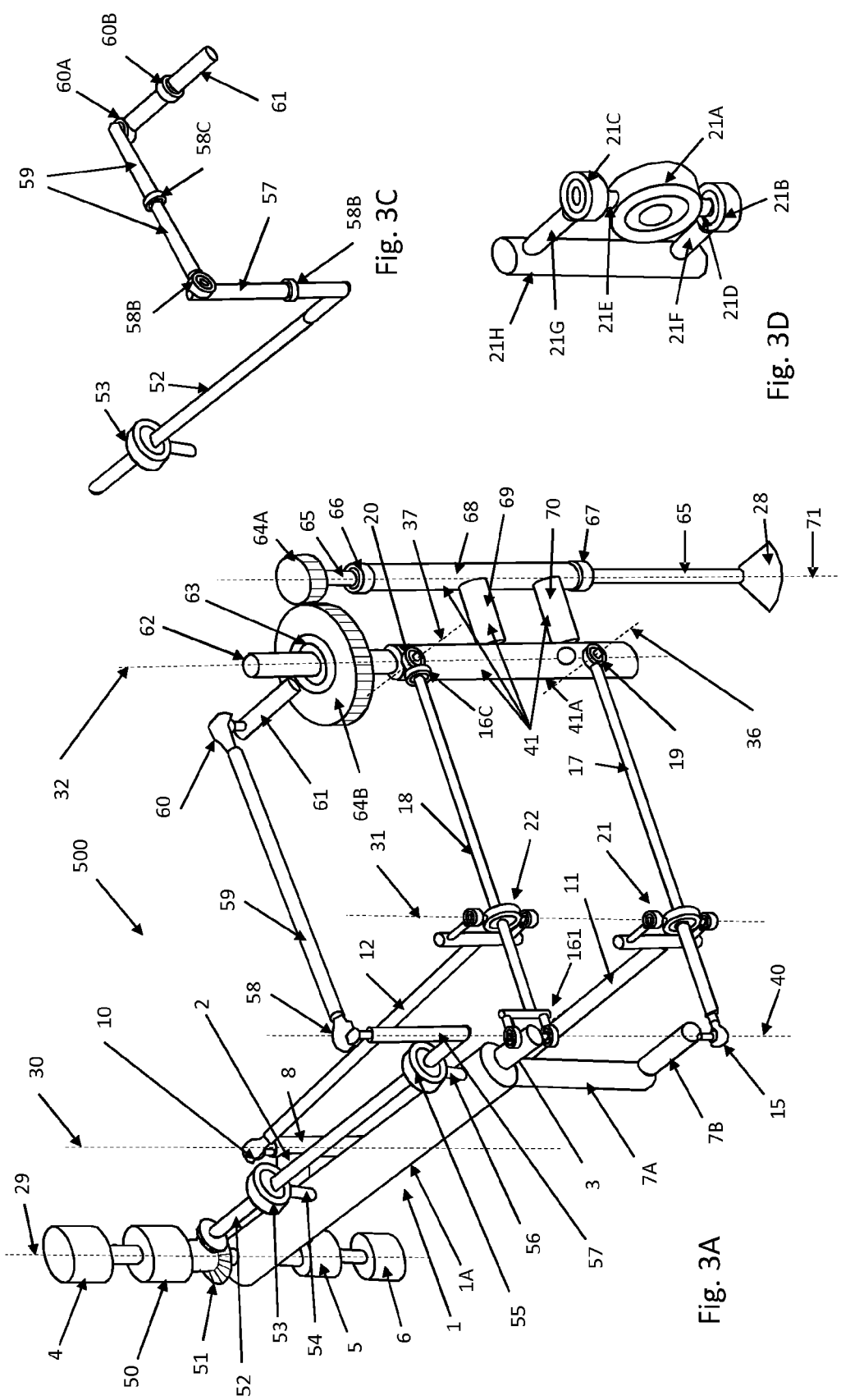

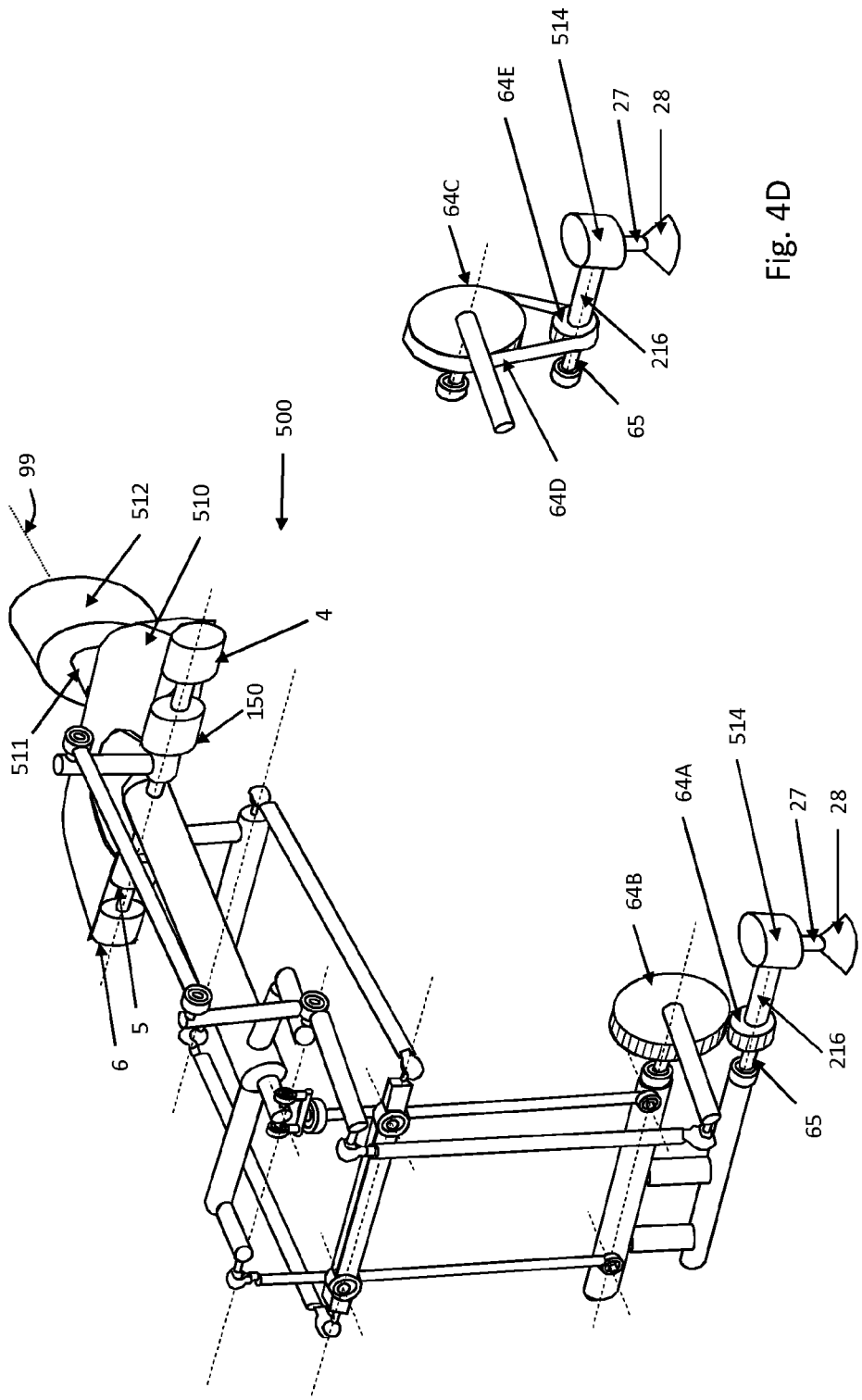

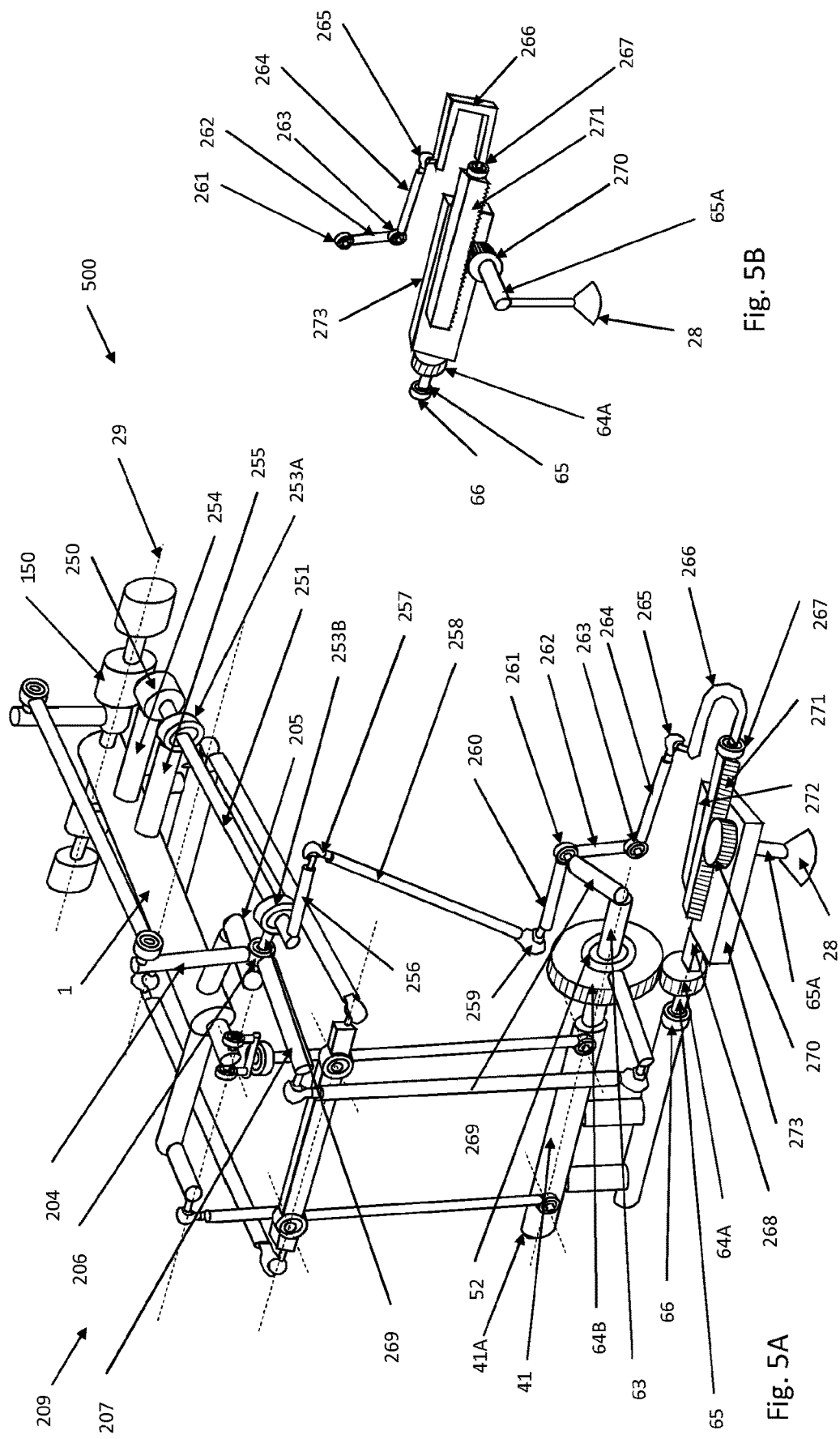

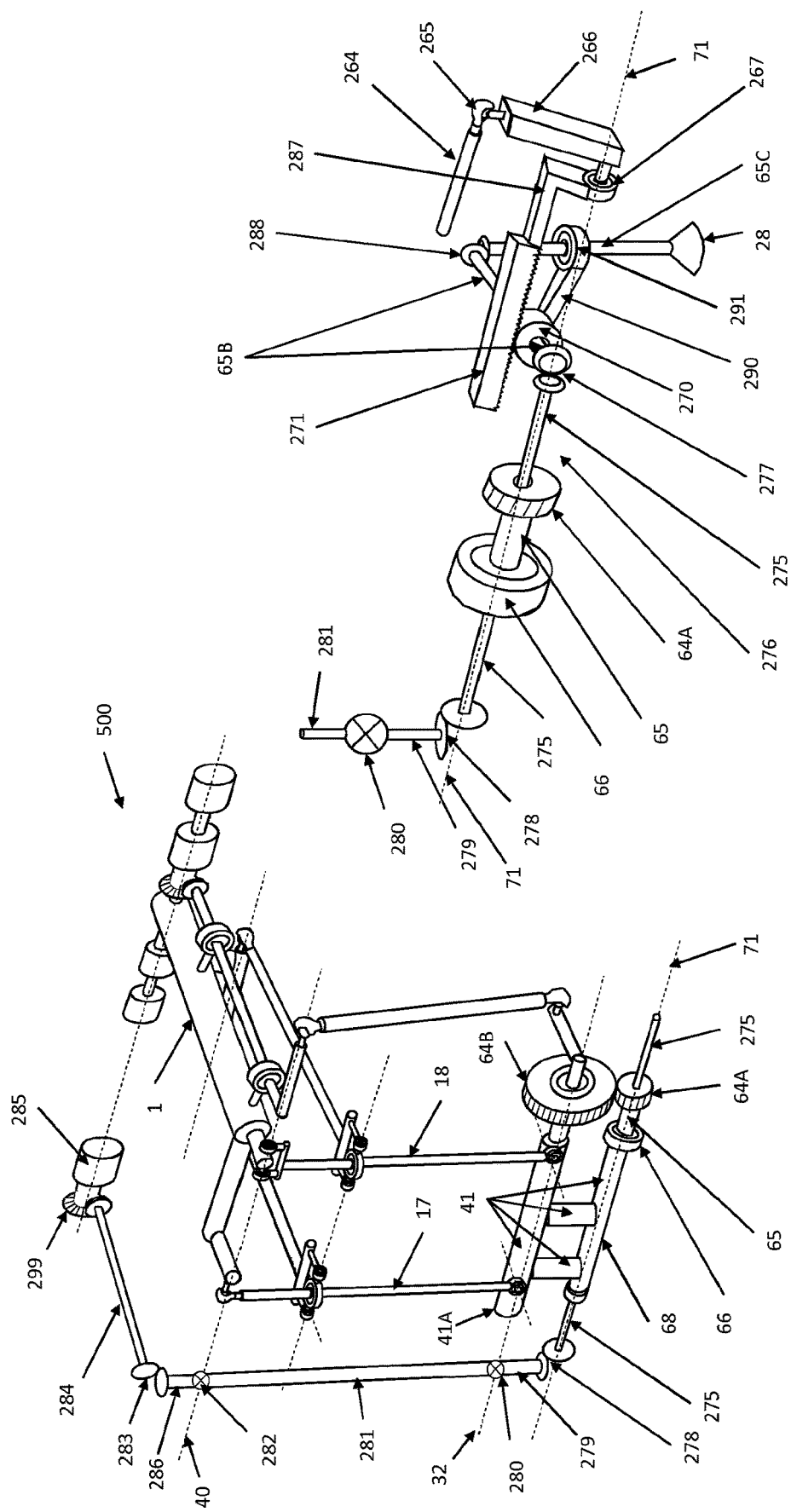

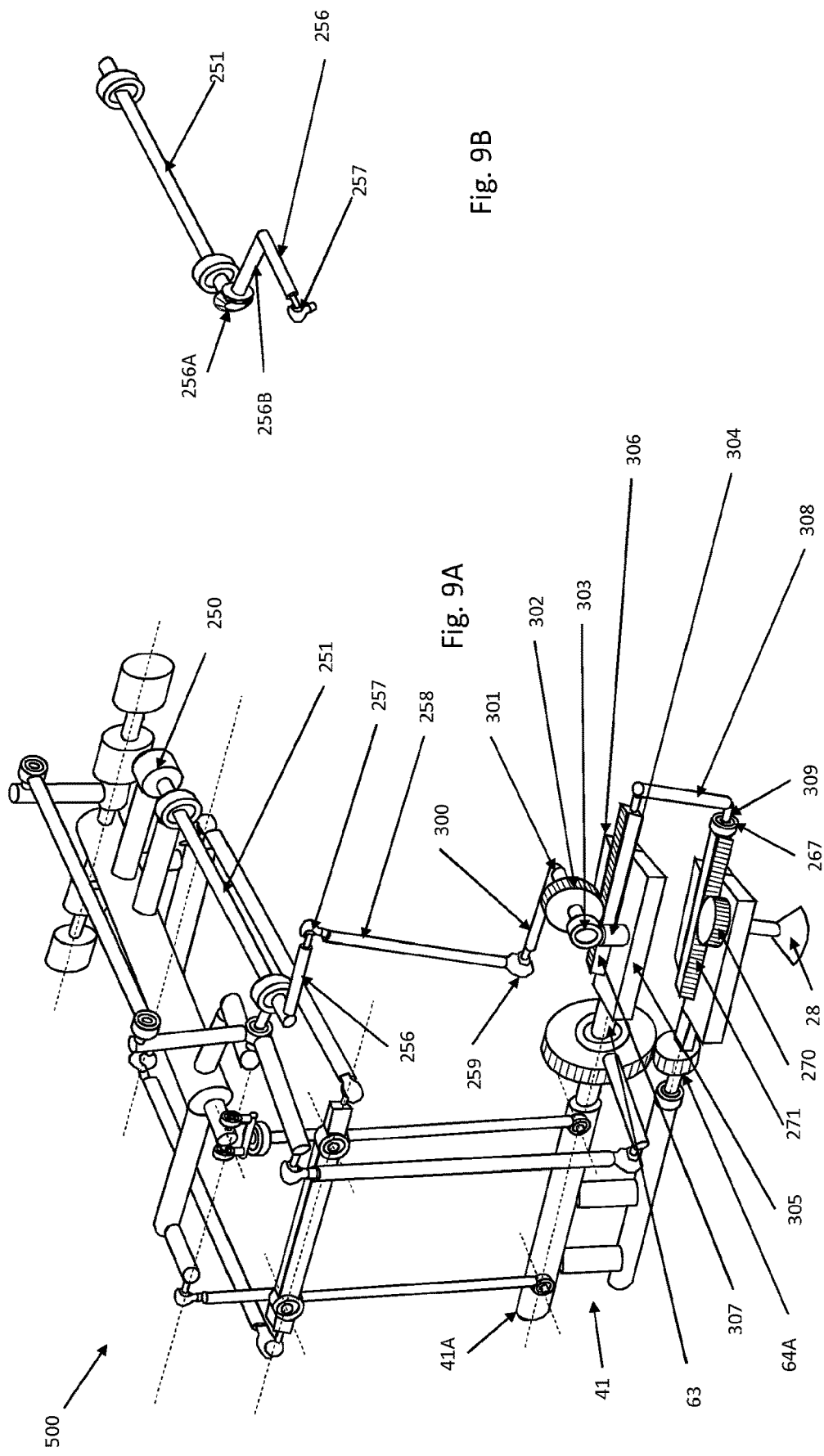

INDUSTRIAL ROBOT ARM

CROSS-REFERENCE TO RELATED APPLICATION

This application is the National Phase, under 35 U.S.C. § 371(c), of International Application No. PCT/EP2019/050611, filed Jan. 11, 2019, which claims priority from European Application No. EP 18151630.3, filed Jan. 15, 2018. The disclosures of all of the referenced applications are incorporated herein by reference in their entirety.

FEDERALLY SPONSORED RESEARCH OR DEVELOPMENT

Not Applicable

TECHNICAL FIELD

The present disclosure belongs to the technical field of industrial robot arms, and in particular to light weight robot arms for very fast processes, for extremely fast movements of objects and for high safety robot installations.

BACKGROUND

High safety installations are needed for example at direct collaboration between human and robot and when it is an advantage to use fenceless robot installations. Looking at the state of art, there are parallel kinematic robots (as the Delta robot described in WO1987003528A1), which have all the actuators mounted on a fixed stand and where it is therefore possible to obtain a light weight structure. However, these parallel kinematic robots have the disadvantage that the arm system occupies a very large space and that the workspace is very small in relation to the space needed for the arm system. Therefore, these robots can only be used for applications where a large space is available for the arm system and where it is enough to have a very restricted workspace, especially in the vertical direction. Thus, the Delta robot is mainly used for pick- and place operations above a flat surface such as a conveyor belt with plenty of space for the robot arm structure.

In the patent application WO2014187486, slim parallel structures are proposed, enabling a larger workspace in relation to the space needed for the arm system in comparison with for example the Delta robot. In this robot structure, a first actuator is driving a first arm about a first axis, a first kinematic chain is configured to transmit rotation of the first arm to the movement of an end-effector and the first kinematic chain has a first rod and a first joint between the first arm and the first rod. The first joint has at least two degrees of freedom (DOF) and a second joint is mounted between the first rod and the end-effector. To work without losing constraints on the six DOF of the end-effector, the design according to WO2014187486 relies on the torsional stiffness of the first rod. However, this means that both the first joint and the second joint of the first rod must have two DOF and not more, which in turn means that it will not be possible to obtain constant tilting angle of the end-effector more than in the middle of the workspace. Therefore, the slim robot concept according to WO2014187486 requires a two DOF wrist even in simple pick- and place operations over a horizontal surface. However, such a wrist will add a substantial weight and the robot will not have an as light weight arm system as for example a Delta robot. Moreover, cabling will be needed to transmit power and to control the actuators of the wrist.

In the patent application WO2015188843, a parallel kinematic robot comprises a base and an end-effector that is movable in relation to the base. A first actuator is attached to the base and connected to the end-effector via a first kinematic chain comprising a first arm, a first rod, a first joint between the first arm and the first rod, and a second joint between the first rod and the end-effector. A second actuator is attached to the base and connected to the end-effector via a second kinematic chain comprising a second arm, a second rod, a third joint between the second arm and the second rod, and a fourth joint between the second rod and the end-effector. A third actuator is attached to the base or to the first arm, and connected to the end-effector via a third kinematic chain comprising a first gear wheel and a second gear wheel, the first and second gear wheels being journaled in bearings to the end-effector and intermeshing with each other. At least one element of the third kinematic chain constitutes a kinematic pair with at least one element of the first kinematic chain. A kinematic chain responsible for a translational movement of the end-effector is thereby utilized as a support structure for a kinematic chain responsible for a rotational movement of the end-effector.

In contrast to the slim structures in WO2014187486, WO2015188843 describes a robot structure needing very large space for its arm system. It contains three separate kinematic chains directly connecting three actuators with the end-effector platform to be moved and therefore significant space is needed for three arms swinging in three different directions. Moreover, the workspace of the robot structure in WO2015188843 is much smaller than for the robot structure in this invention.

WO2015188843 includes an arrangement for rotating a tool mounted on the end-effector platform. The arrangement in FIG. 1 of WO2015188843 consists of serially working links and gears. These links are mounted on two of the three separate kinematic chains connecting the actuators with the end-effector platform and restrict the already limited positioning capability. These restrictions depend on the fact that the links are mounted on two separate kinematic chains, on how the connections of the serially working links are made, and on the fact that the working range of the links are reduced significantly when the arms are rotated away from their zero positions. In FIG. 1 of WO2015188843 a rotation of the tool around a first axis will simultaneously rotate the tool around the second axis and to compensate for this, the rotation range will be lost for the second axis. Moreover, the rotation capability will be severely reduced and achieve a large offset the further the end-effector platform is moved away from the center of the workspace. However, the arrangement in FIG. 2 of WO2015188843 will give large rotation ranges but will reduce the limited workspace even more than the concept described in FIG. 1 of WO2015188843. One reason for this is the need of Cardan joints in the links between the arms and the end-effector platform. Moreover, several serially connected gear steps are needed in the kinematic chain used to rotate the tool. This will increase arm and end-effector platform weight, increase backlash and friction, and increase the requirements on maintenance.

SUMMARY

It is thus an object of the disclosure to alleviate at least some of the drawbacks with the prior art. It is a further object to provide a light weight robot arm that is suitable for very fast processes, for extremely fast movements of objects and/or for high safety robot installations. These objects and others are at least partly achieved by the robot arm according to the independent claim, and by the embodiments according to the dependent claims.

According to a first aspect, the disclosure relates to a robot arm for end-effector motion. The robot arm comprises a first actuator configured to rotate an inner arm-assemblage about a first axis of rotation. The inner arm-assemblage is connected to an outer arm-linkage pivotably arranged around a second axis of rotation, and the outer arm-linkage is connected to an end-effector platform, thereby forming a first kinematic chain from the first actuator to the end-effector platform, which gives a first degree of freedom for positioning the end-effector platform. The robot arm comprises a second actuator configured to rotate the outer arm-linkage around the second axis of rotation, thereby forming a second kinematic chain from the second actuator to the end-effector platform, which gives a second degree of freedom for positioning the end-effector platform. The robot arm further comprises a third actuator configured to rotate a shaft around a third axis of rotation such that the outer arm-linkage is rotated via a joint, thereby forming a third kinematic chain from the third actuator to the end-effector platform, which gives a third degree of freedom for positioning the end-effector platform. The robot arm also comprises a fourth actuator and a fourth kinematic chain configured to transmit a movement of the fourth actuator to a corresponding orientation axis for an end-effector. The fourth kinematic chain comprises an orientation linkage mounted to the inner arm-assemblage via at least one bearing, and an orientation transmission mounted to the end-effector platform. The orientation linkage comprises an end-effector rotation link and joints that provide at least two degrees of freedom for each end joint of the end-effector rotation link.

Thus, the disclosed robot arm is industrially applicable since it has the capabilities to keep constant tilt angle of the end-effector, control the tilt angle of the end-effector, control the rotation angle with constant tilt angle of the end-effector and control both the tilt angle and the rotation of the end-effector, all without including any actuator in the arm structure. These important features are obtained simultaneously with a very slim robot structure and for a very large workspace.

According to some embodiments, the orientation transmission comprises a connection to the end-effector, which gives at least four degrees of freedom for the end-effector motion. Thus, thereby the end-effector can be moved in at least four degrees of freedom without having any actuator in the arm structure.

According to some embodiments, the orientation transmission comprises at least one outer gearing mechanism arranged for rotating the end-effector within an angular range that is determined by the gear ratio of the outer gearing mechanism. Thereby the end-effector may be controlled to obtain a programmed rotation angle when the inner arm-assemblage is arranged to rotate around a vertical axis or a programmed tilt angle when the inner arm-assemblage is arranged to rotate around a horizontal axis.

According to some embodiments, the orientation linkage comprises at least one inner gearing mechanism arranged for rotating the end-effector within an angular range that is determined by the gear ratio of the inner gearing mechanism, without being limited by the rotation of the outer arm-linkage. Hence, large end-effector reorientations can be provided in all of the large workspace.

According to some embodiments, the orientation linkage and the orientation transmission are arranged for rotating the end-effector around an orientation axis without rotational angular limits. Thereby the end-effector can always be rotated such that the shortest possible path (and minimal cycle time) can be chosen.

According to some embodiments, the second kinematic chain comprises the inner arm-linkage including at least one link being connected to the outer-arm linkage via connection bearings, and wherein the second actuator is configured to move the at least one link via at least one inner connection joint connected to the at least one link. The second actuator can therefore be situated at the robot stand, not moving with the arm structure.

According to some embodiments, the outer arm-linkage comprises an outer pair of parallel links connected to the end-effector platform. The inner arm-linkage comprises an inner pair of parallel links that are connected to the outer pair of parallel links of the outer arm-linkage. Also, the second kinematic chain is configured to transmit the rotation of a lever to a corresponding movement of the end-effector platform. Since the outer pair of parallel links prevents undesired rotation of the end-effector platform, no additional wrist motions (actuators and transmission that adds cost and weight) are necessary, for instance in the industrially important case of four degrees of freedom for pick-and-place operations.

According to some embodiments, the outer pair of parallel links and the inner pair of parallel links are connected by means of one connection bearing for each link connection of the respective links, and where the rotation axes of the connection bearings are at a right angle to an axial centerline of each respective link of the outer pair of parallel links. Thereby the outer arm-linkage is accurately controlled by the inner arm-linkage without any uncertainty with respect to the kinematics of the connection points between the links of the inner and outer arm-linkages. The outer arm-linkage is connected via two joints to the inner arm-assemblage such that a line of rotation through the centers of these two joints remains vertical (or horizontal, depending on arm orientation) during positioning.

According to some embodiments, the robot arm comprises a rigid beam connecting the connection bearings mechanically with each other. In this way a more accurate mechanical solution is obtained to transmit the direction of the rotation axis of the inner arm-assemblage to the rotation axis of the end-effector via the serially connected inner and outer arm-linkage. In an alternative embodiment, the bearings of the second pair of bearings are connected to each other with a beam parallel to the end-effector beam.

According to some embodiments, the inner pair of parallel links is mounted via ball-and socket joints on offset beams to the rigid beam. Since the geometry of ball- and socket joints can easily be made with very high accuracy, this further increases the accuracy to transmit the direction of the rotation axis of the inner arm-assemblage to the rotation axis of the end-effector via the serially connected inner and outer arm-linkages.

According to some embodiments, the third kinematic chain comprises an inner transmission connected between the third actuator and an actuating link of the outer pair of parallel links. The inner and most load-carrying part of the robot arm can therefore be made strong but slim, with the inner part of the third kinematic chain well protected.

According to some embodiments, the robot arm comprises a link bearing mounted along the actuating link of the outer pair of parallel links. The rotation axis of the link bearing coincides with a center of the actuating link of the outer pair of parallel links. The link bearing is used in order to avoid any unwanted tilt angle errors of the end effector caused by the rotation of the inner transmission. Thus, the link bearing makes it possible to always swing the inner link pair in two directions with constant end-effector tilt angles.

According to some embodiments, the robot arm comprises end-effector bearings connecting the outer pair of parallel links and the end-effector platform, where the rotation axes of the end-effector bearings are perpendicular to the centers of the outer pair of parallel links. This makes a very slim robot arm structure possible with a light-weight end-effector platform. Because of the end-effector bearings, the outer arm-linkage will constrain all the six DOFs of the end-effector platform and no more links are needed between the rest of the robot structure and the end-effector platform.

According to some embodiments, the rotation axes of the end-effector bearings are parallel with the rotation axes of the connection bearings. Thereby accurate control is obtained for rotating the tool axis.

According to some embodiments, the robot arm comprises connection bearings connecting the links of the outer pair of parallel links and the links of the inner pair of parallel links, where a rotation axis of each connection bearing coincides with the center of the respective link of the outer pair of parallel links. Thereby lower DOFs and thereby lower manufacturing costs are obtained for the joint connections between the outer arm-linkage and the inner arm-linkage.

According to some embodiments, the links of the inner pair of parallel links comprises pairs of parallel links, and these pairs of parallel links are mounted with ball-and socket joints on each side of the links of the outer pair of parallel links. This will make it possible to further increase the accuracy of the connection between the outer arm-linkage and the inner arm-linkage. Moreover, simpler link- and joint solutions can be used with pair of sockets.

According to some embodiments, the inner arm-assemblage comprises an arm link that is hollow and a shaft mounted axially with bearings inside the hollow arm link. The shaft is arranged to be rotated by means of the third actuator. Thereby a very compact inner-arm solution is obtained with internal inner transmission for engaging the outer arm-linkage. Moreover, the inner transmission including two bearings will be fully protected from the environment. In some embodiments, to rotate the rotation line or axis of the bearing pair around an axis perpendicular to the rotation line or axis, the bearing pair may be mounted on the shaft rotating inside the hollow arm link and actuated by a rotary actuator via a 90 degrees gear.

According to some embodiments, the robot arm comprises a plurality of orientation linkages, each comprising an orientation transmission. The plurality of orientation linkages is configured such that a corresponding plurality of concentric output shafts can actuate several end-effector orientations for one or several end-effectors that are arranged onto the end-effector platform. More than one end-effector orientation, such as those actuated by the fourth and the sixth kinematic chains, can therefore actuate very large orientations.

According to some embodiments, the robot arm comprises a plurality of orientation linkages, each with its connected orientation transmission, configured such that each corresponding end-effector orientation is accomplished for one or several end-effectors that are arranged onto the end-effector platform. Thereby, typical existing robot wrists (with rotational shaft normally coming from motors at the robot elbow) for conventional articulated robots can then be used in case such a heavier design suits the application.

According to some embodiments, the robot arm comprises at least two orientation transmissions mounted to the end-effector platform and where an outer gearing mechanism of one of the at least two orientation transmissions is arranged to rotate at least the other one of the at least two orientation transmissions. Thus, a second wrist motion can be added in a decoupled and modular way.

According to some embodiments, the robot arm comprises a fifth actuator and a fifth kinematic chain configured to transmit a movement of the fifth actuator to a corresponding movement of the end-effector arranged onto the end-effector platform via the at least one other orientation transmission. In this way simultaneous tool rotation and tilt can be obtained in the whole workspace of the robot arm. The fifth kinematic chain will always be effective in delivering the needed motion of the connected transmission to obtain the specified end-effector rotation or tilting.

According to some embodiments, the robot arm comprises at least one further actuator and at least one further kinematic chain configured to transmit a movement of the at least one further actuator to a corresponding movement of the end-effector arranged onto the end-effector platform, which gives at least six degrees of freedom for the end-effector motion.

According to some embodiments, the outer gearing mechanism includes a first gear wheel arranged for rotating the tool in one degree of freedom.

According to some embodiments, the first gear wheel is mounted to the end-effector platform in such a way that the rotation axis of the first gear wheel is parallel with the first axis of rotation. Thereby the end-effector will always be perpendicular to horizontal planes in the workspace in a case that the inner arm-assemblage is arranged to rotate around a vertical axis, and the end-effector will always tilt around a horizontal axis when the inner arm-assemblage is rotated around a horizontal axis. These features make the robot arm very useful in applications for picking, placing, packaging and palletizing applications.

According to some embodiments, the outer gearing mechanism includes a second gear wheel, and the first gear wheel is engaged by the second gear wheel that is arranged to be rotated by a gear link via a lever connected to the second gear wheel. Thereby a lightweight arrangement is obtained for rotating the tool since the gear wheels, the lever and the gear link can all be manufactured in carbon reinforced epoxy or composites. This transmission solution also makes it possible to obtain prescribed rotation range or tilt range of the tool, which is obtained by selecting suitable ratio between the radii of the second and the first gear wheels, the ratio usually selected to be bigger than one (1). To control the rotation of the tool when an end-effector beam of the end-effector platform is vertical and to control one tilting angle of the tool when the end-effector beam is horizontal, an outer gearing mechanism such as a gear transmission is used, which may include either of a rotary gear transmission or a linear gear transmission. The gear transmission is mounted on the end-effector platform, now including a first end-effector beam and an optional structure with another end-effector beam parallel with the first end-effector beam. In both cases a first rotary gear wheel is mounted on the other end-effector beam via one or more bearings with rotation axes coinciding with the center of the another end-effector beam. The first rotary gear wheel is mechanically connected to the tool via a shaft. In one example embodiment, a gear link is implemented with a joint of at least two DOF in each end to connect the gear transmission to an actuator via a kinematic chain. In the case of a rotary gear transmission, a second rotary gear wheel, with its rotation axis parallel or coinciding with the center of the end-effector beam, is connected to the gear link via a lever, whereby movements of the gear link will be transformed into rotation of the second rotary gear wheel of the rotary gear transmission. The first rotary gear wheel is forced to rotate by the second rotary gear wheel and the diameter of the first rotary gear wheel may be smaller than the diameter of the second rotary gear wheel.

According to some embodiments, the first gear wheel is engaged by a rack, which is arranged to be moved by the gear link connected to the rack. In this way a more space efficient gear transmission is obtained in relation to using a transmission with two gear wheels. This because no lever mounted on the second gear wheel is needed and because it is possible to make a linear rack thinner than a circular gear wheel. In the case of a linear gear transmission, a linear gear (i.e. rack, with gear ratio determined by the size of the pinion wheel) is connected to the gear link via a joint with at least two DOF, whereby movements of the gear actuation link will be transformed to rotation of the first rotary gear wheel of the linear gear transmission. The first rotary gear wheel (acting as a pinion) is forced to rotate by the linear movement of the rack and favorably the circumference of the first rotary gear wheel is smaller than the length of the linear gear.

According to some embodiments, the robot arm comprises at least two gear transmissions mounted to the end-effector platform and where a first gear wheel of a first gear transmission is arranged to rotate at least one second gear transmission. In this way it will be possible to control both the tilting angle and the rotation angle of the end-effector, which is important in many applications.

According to some embodiments, the at least one second gear transmission is of rack- and pinion gear transmission type, and where the rack is connected to a rack bearing with its axis of rotation parallel with the moving direction of the rack. In this way the control of the first gear transmission will be independent of the control of the second gear transmission, meaning that if the tilt angle of the end-effector is changed by means to the first gear transmission, the rotation angle will not be changed and vice versa. To control the rotation of the end-effector with two DOF, a first rack- and pinion gear transmission is mounted on the first rotary gear wheel. The linear gear (i.e. rack) is connected to a second gear link via a rack bearing and a lever arrangement.

According to some embodiments, at least one pinion of the at least one second gear transmission is connected to the end-effector to obtain tool rotation. Thereby it is possible to rotate the end-effector with the second gear transmission independent of that the first gear transmission performs the tilting of the tool and vice versa. In other words, the pinion of the first rack and pinion transmission are connected such that the end-effector may be tilted or rotated.

According to some embodiments, at least one rack bearing has its axis of rotation coinciding with the axis of rotation of the first gear wheel. The rack bearing is here essential in order to make the rotation control independent of the tilt control of the end-effector and by mounting the axis of rotation of the rack bearing coinciding with the rotation axis of the first gear wheel, more accurate mechanical transmission to the second gear transmission is obtained. In other words, the rotation center of the rack bearing coincides with the rotation center of the rotary gear wheel that carries the first rack and pinion transmission.

According to some embodiments, the robot arm comprises one pinion of the at least one second gear transmission that is connected to the end-effector via a right-angle gear. Thereby it will be possible to obtain the control of two tilting angles and one rotation angle of the end-effector. In this way a six axes robot arm is achieved without any actuators in the arm structure and all actuators mounted fixed to a robot stand.

According to some embodiments, the robot arm comprises one pinion of the at least one second gear transmission that is connected to an end-effector shaft on which the end-effector is mounted via a bearing with its axis of rotation coinciding with the axis of rotation of the end-effector shaft. In order to obtain a rotation angle via a right-angle gear and simultaneously a tilt angle, the end-effector shaft is mounted on a bearing that is connected to the pinion of the second gear transmission. The rotating the pinion of the second gear transmission will in this way tilt the bearing, on which the end-effector shaft is mounted.

According to some embodiments, the robot arm comprises one rack- and pinion gear transmission comprising two racks connected via a common pinion and where the two racks are arranged to move at right angle relative to each other. Thereby it is possible to actuate two tilting angles and one rotation angle independent of each other, which means that actuating any of the tilting angles or the rotation angle will not change the other angles. This means that the restricted angular working ranges for the tilting angles and the rotation angle can be fully used everywhere in the workspace of the robot arm and independent of the actual tilt- and rotation angles of the end-effector.

According to some embodiments, the robot arm comprises two racks that are connected to each other via a rack shaft and a rack bearing. Thereby a third rack can be rotated by a second rack pinion while connected to a first rack, which makes the rotation angle of the end-effector independent of one of the tilt angles of the end-effector.

According to some embodiments, the rack shaft is arranged to move freely in an axial through hole of a pinion belonging to another rack-and pinion transmission. Thereby a third rack may be rotated by a second rack pinion while connected to a first rack, which makes the rotation angle of the end-effector independent of one of the tilt angles of the end-effector.

According to some embodiments, the robot arm comprises at least one rack bearing that is connected to the fifth actuator via a fixed rack- and pinion transmission mounted on the end-effector platform. Thereby a simpler link structure is obtained for the fifth kinematic chain.

According to some embodiments, the rack bearing is connected to the rack of the fixed rack- and pinion transmission. In this way the use of the fixed rack- and pinion in order to simplify the fifth kinematic chain will still make it possible to perform independent control of the tilt angles and the rotation angle.

According to some embodiments, the pinion of the fixed rack- and pinion transmission includes a lever, on which a gear link is mounted via a joint of at least two DOF. Thereby an efficient transmission is obtained for the fifth kinematic chain, where the working range of the end-effector rotation or rotation angle can be defined by the diameter of the pinion of the fixed rack- and pinion transmission.

According to some embodiments, an actuating link of the outer arm-linkage is connected to the third actuator via a pair of bearings of which the common rotation axis is rotatable around an axis parallel with the center axis of the inner arm-assemblage. Thereby the robot arm will be especially suited for applications where high stiffness transmission is needed for motion of the end-effector in the direction of the rotation axis of the first axis. In another embodiment, the gear link is at one end connected to a lever, which is mounted on a bearing with its rotation axis parallel with the end-effector beam. The lever is connected to a rotary actuator via two more levers and a link. To rotate the rotation line or axis of the bearing pair around an axis perpendicular to the rotation line or axis, the bearing pair is in one design mounted on a bearing with its rotation axis parallel with the center axis of the hollow link of the inner arm-linkage, and a lever is used to rotate the bearing pair around the rotation axis of the bearing on which the bearing pair are mounted. The lever is connected to an actuator via a link with joints at each end.

According to some embodiments, the link transmission includes a rotating shaft with a lever in one end and where the lever is connected to a gear link via a joint of at least two DOF. This embodiment is especially useful in applications where a slim inner arm-assemblage is needed, meaning that the robot arm needs to work in a restricted environment. Moreover, this solution will have the highest transmission efficiency to control the rotation angle or any of the tilting angles of the end-effector. In one exemplary embodiment, the gear transmission is connected to an actuator via a kinematic chain and the gear link is in one end connected to a lever mounted on a second rotary shaft with its rotation axis parallel with the hollow link of the inner arm-assemblage.

According to a second aspect, the disclosure relates to a robot arm for positioning an end-effector in three degrees of freedom, with constant tilt angle. The robot arm comprising an end-effector platform arranged for receiving the end-effector. The robot arm comprises a first actuator configured to rotate an inner arm-assemblage about a first axis of rotation. The inner arm-assemblage being connected to an outer arm-linkage pivotably arranged around a second axis of rotation. The outer arm-linkage comprises an outer pair of parallel links being connected via end-effector bearings to the end-effector platform, thereby forming a first kinematic chain from the first actuator to the end-effector platform. The robot arm comprises a second actuator configured to rotate the outer arm-linkage around the second axis of rotation. The outer-arm linkage being connected via universal joints including connection bearings to an inner arm-linkage comprising an inner pair of parallel links, thereby forming a second kinematic chain from the second actuator to the end-effector platform. The robot arm also comprises a third actuator configured to rotate a shaft around a third axis of rotation such that the outer arm-linkage is rotated around the third axis of rotation via an elbow joint, thereby forming a third kinematic chain from the third actuator to the end-effector platform.

BRIEF DESCRIPTION OF THE DRAWINGS

FIG. 2A illustrates a robot arm structure according to some other embodiments.

FIG. 2B illustrates a detail of a type of universal joint mounted on the rotary shaft of the inner transmission in FIG. 2A.

FIG. 3A illustrates an industrial robot arm according to a first embodiment that enables an end-effector to be actuated to rotate around an axis perpendicular to the horizontal plane.

FIG. 3C illustrates an orientation linkage according to some embodiments.

FIG. 3D illustrates a universal joint according to some embodiments.

FIG. 4C illustrates an industrial robot arm according to another variant of the third embodiment.

FIG. 4D illustrates an alternative embodiment with a belt drive.

FIG. 5A illustrates an industrial robot arm according to a fourth embodiment, where an end effector may be controlled to both rotate and tilt.

FIG. 5B illustrates an alternative embodiment of a rack to tilt an end effector with two DOF.

FIGS. 6A and 6B illustrate an industrial robot arm according to a fifth embodiment, including a combination of the rack- and pinion concept in FIGS. 5A and 5B with a transmission including right-angle gears and Cardan joints to obtain six DOF robot arm with all actuators fixed to the robot stand.

FIG. 9A illustrates an industrial robot arm according to a sixth embodiment with an alternative transmission to the rack- and pinion arrangement in FIG. 5.

FIG. 9B illustrates an alternative orientation linkage according to some embodiments.

DETAILED DESCRIPTION

Figure 1:
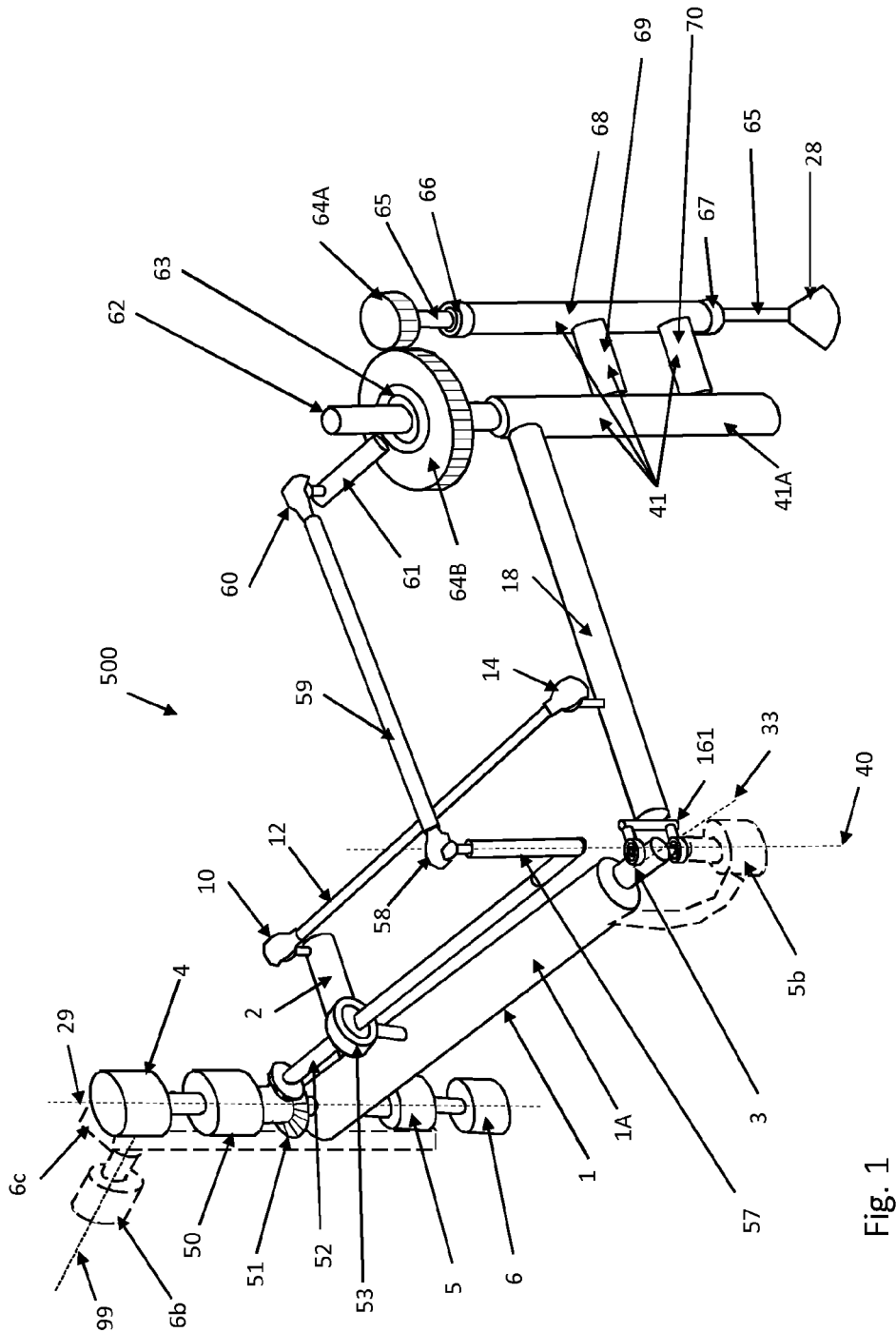
FIG. 1 illustrates a robot arm structure according to some embodiments, that enables an end-effector to be actuated to rotate around an axis perpendicular to the horizontal plane.

To obtain a light weight robot structure of an industrial robot, the invention makes use of new combinations of parallel robot structures and transmissions. The actuators of the robot arm may be mounted on a fixed robot stand and the heavy weight of the actuators then does not need to be moved around by the arm structure. An arm structure of the robot may then be implemented with only light weight components such as carbon tubes, carbon gears and carbon bearings. This enables design of the robot with minimum inertia for high speed, acceleration and acceleration derivative. Moreover, when no or less actuators are placed in the arm structure itself, it may be much easier to build a robot that can work in an environment with explosion risks as for example on oil- and gas platforms and in industries where explosives are handled. It may also be easier to build robots that can work in harsh environments as for outdoor handling equipment, tunnel inspection and vehicle cleaning systems.

The disclosed industrial robot arm solves the problem of how to obtain constant tilt angles of the end-effector of the industrial robot arm and simultaneously obtain a slim design of the robot arm. This makes it possible for the robot arm to perform pick- and place operations with limited space requirements over a horizontal surface without any added wrist for the compensation of end-effector tilting errors. Moreover, the robot arm according to the present invention may include up to six degrees of freedom (DOF) with all actuators fixed to the stand. The end-effector may also be referred to as a tool.

For clarity of the following description, we refer to a normal and preferred arrangement with positioning in x, y and z direction relative to a robot stand (not shown) of an end-effector platform, which provides a base for tool orientation(s) in one (1) or several DOF. Tool orientations include tool rotation as actuated by some tool transmission, either around a tool-connecting shaft at the end-effector platform or around some axis perpendicular to the tool-connecting shaft, or both for five DOF. For six DOF a tilting tool rotation may be added, or desired tool tilting can form one of axis four or five. In any case, it is highly desirable to have the end-effector platform being positioned without a (in this case undesired) tilting motion, thereby separating tool positioning from tool orientation. In principle, but omitted for clarity, several end-effectors and tool orientation mechanisms/transmission can be attached onto the end-effector platform, for instance pointing at different direction and having different type of tools mounted, thereby carrying different tools for different purposes, and avoiding a need for using tool-exchangers. As will be evident from the following description, the different transmissions for tool orientation can be combined such that all actuators can still be fixed to the robot stand. Thus, more than 6 DOF is possible, but for simplicity not explained in any detail.

The industrial robot arms disclosed herein incorporates a scheme of four or five axes that, in some embodiments, are always parallel to each other. The structure can either be mounted in such a way that all the axes are either vertical or horizontal (or at any other angle) including one or more of the following:

In an exemplary embodiment where the axes are vertical, the obtained movements of the end-effector are such that the end-effector is always perpendicular to a horizontal surface in the whole workspace.

In an exemplary embodiment where the axes are vertical, the rotation of the end-effector around a vertical axis may be controlled via an added link transmission and a gear, whereby the actuator for the control of the end-effector rotation may be fixed to the robot stand.

In an exemplary embodiment where the axes together with a fifth axis are horizontal, the structure contains an added link transmission together with a gear to keep the end-effector perpendicular to a horizontal surface in the whole workspace.

In an exemplary embodiment where the axes together with a fifth axis are horizontal, the added link transmission together with the gear may be used to control one tilting angle of the end-effector in the whole workspace. The actuator for the control of the tilting angle of the end-effector may be fixed to the robot stand.

In an exemplary embodiment where the axes together with a fifth axis are horizontal, a second added link transmission together with a rack- and pinion gear may be used control the rotation of the end-effector simultaneously with the tilting of the end-effector. The actuators for the control of the tilting angle and the rotation angle of the end-effector may be fixed to the robot stand. Also, with a third link the end-effector may be controlled to rotate with three DOF.

Moreover, the robot arms according to the embodiments of the present disclosure makes possible a slimmer design compared to a robot design according to WO2014187486 and WO2015188843, since only two parallel links are needed in the link structure connecting the end-effector platform with the inner arm-assemblage.

In the present disclosure, a robot is defined to comprise a robot arm and a robot controller. A robot arm comprises actuators for accomplishing end-effector movements. The robot controller, or a computer connected to the robot controller, may comprise a program with instructions for moving the end-effector according to the program. The robot controller and/or computer comprises memory and processor, the program is saved in the memory. The robot arm is thus a programmable robot. However, the robot may be of various kinds, for example an industrial robot or a service robot.

FIG. 1 illustrates a basic embodiment of the robot arm 500, including a structure according to some embodiments to obtain tool rotation, but excluding tool tilting.

The robot arm comprises a first actuator 4 configured to rotate an inner arm-assemblage 1 about a first axis of rotation 29. The inner arm-assemblage 1 is connected to an outer arm-linkage, here comprising an actuating link 18. The outer arm linkage is pivotably arranged around a second axis 40 of rotation. The outer arm-linkage is connected to an end-effector platform 41, thereby forming a first kinematic chain from the first actuator to the end-effector platform. This gives a first degree of freedom for positioning the end-effector platform, and thereby also for the end-effector motion.

The robot arm 500 in FIG. 1 also has a second actuator 5 configured to rotate the outer arm-linkage around the second axis of rotation 40, thereby forming a second kinematic chain from the second actuator to the end-effector platform. This gives a second degree of freedom for positioning the end-effector platform. The second kinematic chain may be designed in different ways. One possibility is to have a second kinematic chain of links between the second actuator 5 and the actuating link 18. This possibility is exemplified in the FIG. 1 with the actuating link connected to the inner arm-assemblage 1 by a pair of bearings (rotating around the second axis of rotation 40) that are part of the joint 16, and with a lever 2 mounted on the output shaft of the second actuator 5 for rotation about the first axis of rotation 29. The lever 2 is connected to the actuating link by means of an inner arm-linkage comprising a link 12 with joints 10, 14 in each end.

The joints 10, 14 are depicted as ball-and-socket joints with at least two degrees of freedom, but of course other kinematically equivalent embodiments are possible, as explained below for the end-effector rotation link (and FIG. 3C).

In other words, the second kinematic chain comprises the inner-arm linkage including the lever 2 and the link 12 that connects to the outer-arm linkage, the outer-arm linkage including the actuating link 18 that here (in FIG. 1) is firmly connected to the end-effector platform 41 and beam 41A. Thus, the second kinematic chain comprises the inner arm-linkage including at least one link 12 being connected to the outer-arm linkage via connection bearings 14. The second actuator is configured to move the at least one link 12 via at least one inner connection joint 10 connected to the at least one link 12. Another alternative for actuating the second degree of freedom is to have the second actuator mounted at the end of the inner arm-assemblage 1 with the rotating shaft of the second actuator in parallel with the second axis of rotation 40. This alternative arrangement, with the second actuator referred to as 5b, is illustrated with hatched lines since it is not a preferred embodiment because the actuator moves with the arm structure, but it eliminates the need for the inner arm-linkage giving a more compact inner-arm design. In this alternative, the second kinematic chain comprises the mechanical connection with optional transmissions between the rotating second actuator 5b and the actuating link 18. Thus, the second actuator 5, 5b moves the end effector platform 41 in one direction, which in combination with the first kinematic chain gives a second degree of freedom for positioning the end-effector platform and thereby also for the end-effector motion.

The robot arm 500 in FIG. 1 also comprises a third actuator 6 configured to rotate a shaft 3 around a third axis of rotation 33. The third actuator 6 is arranged to rotate the shaft 3 around a third axis of rotation such that the outer arm-linkage is rotated via a joint 161, thereby forming a third kinematic chain from the third actuator to the end-effector platform. This gives a third degree of freedom for positioning the end-effector platform.

The third kinematic chain can be designed in different ways. According to one example embodiment, a 90 degrees angle wheel (not visible in the FIG. 1 but the same concept as illustrated with reference number 51 for actuating the fourth DOF below) between the output shaft of the third actuator 6 and a rotating shaft 3 inside the inner arm-assemblage 1. This shaft 3 will then rotate the actuating link 18 up and down around the rotational axis 33, and thus the end effector platform 41 will move up and down. Another alternative embodiment is to use the third actuator (in this case 6b, fixed to the robot stand, illustrated with hatched lines since it is not a preferred alternative) to rotate the other actuators (mounted on a shelf 6c, the second actuator 5b alternatively at the end of the inner arm-assemblage 1) around a rotation axis 99 perpendicular to the first axis of rotation 29. The rotation axis 99 being perpendicular to the rotation axis 29 by definition permits two different arrangements, possibly with dual actuators 6b arranged to rotate around an x and a y axis respectively (assuming axis 29 point in z direction), which can be used to maintain manipulability for the end-effector when the outer arm linkage is stretched all the way in or all the way out (close to or being singular, not allowed in preferred embodiments). In any case, the third kinematic chain comprises the inner arm-assemblage 1 and an outer arm-linkage only consisting of the actuating link 18 attached to the end-effector beam 41A. In total, the embodiment depicted in FIG. 1 will enable a maximally lean arm design, but it will exhibit undesired tilting in most parts of the workspace, and hence further embodiment (FIG. 2 and further) are needed for industrial applicability.

The robot arm 500 in FIG. 1 also comprises a fourth actuator 50 and a fourth kinematic chain. The fourth kinematic chain is configured to transmit a movement of the fourth actuator to a corresponding orientation axis for an end-effector 28. The orientation axis is defined by the shaft 65. The fourth kinematic chain comprises an orientation linkage 52, 57, 59 mounted to the inner arm-assemblage via at least one bearing 53. The fourth kinematic chain also comprises an orientation transmission 64B, 64A mounted to the end-effector platform. The orientation linkage comprises an end-effector rotation link 59 and joints 58, 60 that provide at least two degrees of freedom for each end-joint of the end-effector rotation link. In one embodiment, the end-effector rotation link 59 are connected to a joint 58, 60 at each end of the end-effector rotation link 59, respectively. Of course, joints 58, 60 can be accomplished in several ways that are kinematically equivalent to at least two degrees of freedom with at least two degrees of freedom, for instance as depicted in FIG. 3C.

The orientation linkage may be implemented with different link structures. In FIG. 1, the fourth actuator 50 is connected to a 90 degrees angle gear 51 driving a shaft 52, on which a lever 57 is mounted.

The orientation transmission may also be implemented in different ways, for example by rack and pinion gears or by backhoe linkages. In FIG. 1, the orientation transmission is implemented with an orientation transmission comprising gear wheels 64A, 64B mounted to the end effector platform 41. With the implementations of the orientation linkage and orientation transmissions shown in the FIG. 1, the orientation linkage is mounted to the joint 58 with the lever arm 57 and the orientation transmission is mounted to the joint 60 via a lever arm 61 mounted on the gear wheel 64B. Thus, the fourth actuator 50 will, because of the second kinematic chain, be able to rotate the gear wheel 64A. This will be possible even when the first, second and third actuators move the end effector platform in three different directions, x, y and z. The gear wheel 64A is connected to a shaft 65 rotating in a bearing 67. The orientation transmission comprises a connection to the end-effector 28, in this embodiment referred to as a shaft 65, which gives at least four degrees of freedom for the end-effector motion.

FIG. 2A illustrates a structure of a robot arm 500 included in some embodiments of the disclosure, including the desired constant tool tilt angle, but excluding the fourth kinematic chain for the tool rotation. In other words, this structure makes it possible to move a tool 28 in x-, y- and z-directions while maintaining constant tilt angles. The three actuators 4, 5 and 6 have a common vertical rotation axis, here coinciding with the first axis of rotation 29. The three actuators are arranged to move the tool 28 in such a way that an end-effector beam 41A of an end-effector platform 41 will always be parallel with the common rotation axis of the actuators. More in detail, the robot arm 500 comprises a first actuator 4 configured to rotate the inner arm-assemblage 1 about the first axis of rotation 29. The first kinematic chain is here configured to transmit the rotation of the inner arm-assemblage 1 to a corresponding movement of the end-effector platform 41, which in FIG. 2A only includes an end-effector beam 41A. Hence, according to the present invention the end-effector platform may be made much simpler than in the referred prior art, only including a beam instead of a more complex end-effector platform.

The first kinematic chain comprises an outer arm-linkage comprising an outer pair of parallel links 17, 18 that each at one end is connected to the end-effector platform 41. The first link 17 of the outer pair of parallel links 17, 18 is connected at its other end to the inner arm-assemblage 1. Here the inner arm-assemblage 1 is designed to swing in a horizontal plane, actuated by the first actuator 4 aligned to the vertical first axis or rotation 29. The inner arm-assemblage 1 carries the two parallel links 17 and 18. The two parallel links 17, 18 are connected at their outer end to a vertical end-effector beam 41A of end-effector platform 41, which in turn carries a tool 28, in the figures illustrated as a vacuum gripper, via a shaft 27 protruding from the end-effector platform 41, here the end-effector beam 41A. The first link 17 of the outer pair of links is connected to the inner arm-assemblage 1 by means of a ball and socket joint 15 via attachment parts 7A and 7B. The attachment parts 7A, 7B are rigid mechanical parts as for example carbon rods connecting the ball of the joint 15 rigidly with the inner arm-assemblage 1. The joint 15 could also be implemented as a universal joint with three DOF. In some embodiments, one, several or all of the joints 9, 10, 13, 14 and 15 are ball and socket joints, cardan or universal joints. In some embodiments, the joint 16 is a universal joint. In some embodiments, one or both of the joints 19 and 20 are hinge joints.

The robot arm 500 in FIG. 2A also comprises a second actuator 5 configured to rotate a lever 2 about the first axis of rotation 29. A second kinematic chain is configured to transmit the rotation of the lever 2 to a corresponding movement of the end-effector platform 41. The second kinematic chain comprises an inner arm-linkage comprising an inner pair of parallel links 11, 12 connected to the outer arm-linkage, thus connected to, e.g. between the ends, of the outer pair of parallel links 17, 18. In other words, the second kinematic chain comprises the inner-arm linkage comprising an inner pair of parallel links 11, 12, and a lever 2. The inner pair of parallel links is connected to the lever and to the outer-arm linkage comprising the outer pair of parallel links 17, 18. The second actuator 5 is arranged to rotate the lever about the first axis of rotation 29. Also, in some embodiments, the outer arm-linkage comprises an outer pair of parallel links 17, 18 connected to the end-effector platform 41. The second kinematic chain is configured to transmit the rotation of the lever 2 to a corresponding movement of the end-effector platform.

The robot arm 500 further comprises a third actuator 6. A third kinematic chain is configured to transmit a movement of the third actuator 6 to a corresponding movement of the end-effector platform 41. The third kinematic chain comprises an inner transmission 3, 16, (161, FIG. 1) between the third actuator 6 and the other end of the actuating link 18 of the outer arm-linkage. In other words, the third kinematic chain comprises an inner transmission connected between the third actuator and an actuating link of the outer pair of parallel links. The actuating link 18 of the outer arm-linkage is here connected to a rotary shaft 3 of the inner transmission by means of a type of universal joint 16. The rotary shaft 3 is arranged to rotate inside a hollow link 1A of the inner arm-assemblage 1, where it is supported by one bearing at each end (not shown in the figure). The rotary shaft 3 is connected to the third actuator 6 via a 90 degrees angle gear (not shown in the figure) at the inner end of the hollow link 1A. The outgoing shaft from the third actuator 6 is assembled through a hollow shaft of the second actuator 5 to reach the 90 degrees gear. In other words, the robot arm 500 comprises an inner arm-assemblage including one link 1A that is hollow, and the inner transmission of the third kinematic chain includes a shaft 3 mounted axially with bearings inside the hollow link 1A. The shaft 3 is arranged to be rotated by means of the third actuator 6. By rotating the rotary shaft 3, the parallel links 17 and 18 will swing up and down to obtain vertical movements of the tool 28. In order to swing the outer arm-linkage in the horizontal plane, the lever 2 is connected to the outer arm-linkage via the inner arm-linkage. The lever 2 is arranged to be actuated by the second actuator 5 and is connected to the links 11 and 12 via a beam 8 and ball- and socket joints 9 and 10. The joints 9, 10 are also referred to as inner connection joints. The inner arm-linkage are connected to the outer arm-linkage by means of joints 13 and 14, beams 23 and 24 and connection bearings 21 and 22. In one example embodiment, the inner pair of parallel links 11, 12 is mounted via ball- and socket joints 13, 14 on offset beams 23, 24 to a rigid beam 25. Between the bearings 21 and 22 the beam 25 is connected to the bearings 21, 22, which constrain the end-effector beam 41A of the end-effector platform 41 to always be vertical. Simultaneously, the beam 25 can be used to obtain a pre-stress on the connections to the links 17 and 18 of the outer arm-linkage, meaning reduced backlash in the bearings 19, 20, 21, 22 and in the joints 15 and 16. That is, the bearings connect at the ends of the links 17, 18 of the outer arm-linkage. Thus, in an example embodiment, the robot arm 500 comprises the rigid beam 25 connecting the connection bearings 21, 22 mechanically with each other.

The outer arm-linkage is connected to the end-effector beam 41A by means of the end-effector bearings 19 and 20. Moreover, the end-effector bearings 19, 20 connects the outer pair of parallel links 17, 18 and the end-effector platform 41, where the rotation axes 36, 37 of the end-effector bearings 19, 20 are perpendicular to the centers of the outer pair of parallel links 17, 18.

To guarantee that the end-effector beam 41A of the end-effector platform 41 will have a constant tilt angle such that the tool 28, e.g. a vacuum gripper, will always be able to pick and place items with a vertical angle in relation to the horizontal plane, the design of the robot arm 500 may include one or more of the following:

- The common first axis of rotation 29 for the first actuator 4, the second actuator 5 and the third actuator 6 is vertical.
- The beam 8 and the mounting of the joints 9 and 10 is assembled in such a way that axis 30 that goes through the centers of the joints 9 and 10 is always parallel with the first axis of rotation 29.
- The links 11 and 12 have the same length, meaning that the distance between joints 9 and 13 is the same and the distance between joints 10 and 14.
- The distance between joints 13 and 14 is the same as the distance between joints 9 and 10.
- The distance between the centers of the joints 15 and 16 is the same as the distance between the rotation center 36 of the bearing 19 and the rotation center 37 of the bearing 20.
- The distance between rotation centers 34 and 35 of the bearings 21 and 22 is the same as the distance between the rotation centers 36 and 37 of the bearings 19 and 20.
- The distance between the rotation centers 34 and 35 of the bearings 21 and 22 is the same as the distance between the rotation centers of joints 15 and 16.
- The length of link 17 has the same length as the length of link 18, meaning that the distance between the rotation center of joint 15 and the rotation center 36 of bearing

19 should be the same as the distance between a rotation center 33 of the rotary shaft 3 and a rotation center 37 of bearing 20.

The distance between the rotation center 36 of bearing 19 and the rotation center 34 of bearing 21 is the same as the distance between the rotation center 37 of bearing 20 and the rotation center 35 of bearing 22.

The bearings 19, 20, 21 and 22 are mounted in such a way that their axes of rotation 36, 37, 34 and 35 are parallel and at a right angle to the axes 31 and 32, which are parallel to the axes 29, 30 and 40. Thus, the rotation axes 36, 37 of the end-effector bearings 19, 20 are parallel with the rotation axes 34, 35 of the connection bearings 21, 22.

Axis 40 goes through the center of joints 15 and 16. The axis 40 is also defined by the centers of bearings 16A and 16B when the link 18 is horizontal. The axes 34 and 35 are also perpendicular to the links 17, 18 of the outer arm-linkage. In other words, the outer arm-linkage (the outer pair of parallel links 17, 18) and the inner arm-linkage (the inner pair of parallel links 11, 12) are connected by means of one connection bearing 21, 22 for each link connection of the respective links 11, 12, 17, 18, and where the rotation axes 34, 35 of the connection bearings 21, 22 are at a right angle to an axial centerline of each respective link 17, 18 of the outer arm-linkage.

FIG. 2B illustrates a detail of the type of universal joint 16 mounted on the rotary shaft 3 of the first transmission. This joint 16 connects the rotary shaft 3 to the actuating link 18 of the outer arm-linkage and makes the end-effector beam 41A of the end-effector platform 41 to move vertically. The bearings 16A and 16B are symmetrically mounted by means of pins 16D and 16E on the rotary shaft 3. Since the axis of rotation 40 is defined by the common axis of rotation of the bearings 16A and 16B, the actuating link 18 rotates around the axis 33, and the axis of rotation 40 will also rotate around the axis 33. In more detail, the actuating link 18 of the outer arm-linkage is connected to the third actuator 6 via a pair of bearings 16A, 16B of which the common rotation axis 32 is rotatable around an axis parallel with the center axis of the hollow link of the inner arm-assemblage 1. The rotating outer parts of the bearings 16A and 16B are connected to the beam 16H by means of the attachments 16F and 16G. The attachments 16F, 16G are rigid mechanical structures such as rods. The attachments 16F, 16G and beam 16H may be implemented as a solid fork made in carbon reinforced epoxy. The actuating link 18 is connected to the beam 16H via the bearing 16C, which makes it possible for the actuating link 18 to rotate around its own axis. The bearing 16C is here referred to as a link bearing 16C. Since this link bearing 16C makes it possible for the actuating link 18 to rotate around its own axis, it will be possible to keep the axes 31 and 32 vertical in the whole workspace of the tool 28. The link bearing 16C can be placed anywhere between joint 16 and the mounting position of the bearing 22 to the actuating link 18 of the outer arm-linkage. Thus, in other words, the robot arm comprises a link bearing 16C mounted along the actuating link 18 of the outer pair of parallel links 17, 18, where the rotation axis of the link bearing 16C coincides with a center of the actuating link 18 of the outer pair of parallel links. This link bearing 16C is a differentiating feature in relation to WO2014187486. Thus, the robot arm 500 may in an example embodiment comprising the link bearing 16C mounted to the actuating link 18 of the outer arm-linkage between the connection bearing 22 and a connection of the actuating link 18 to the inner transmission 3, and where the rotation axis of the link bearing 16C is coinciding with a center of the actuating link 18 of the outer arm-linkage. Another feature is the mounting of the links 17 and 18 with bearings 19 and 20 on the end-effector beam 41A of the end-effector platform 41. This makes it possible to build a much slimmer robot than described in WO2014187486 since only two links 17 and 18 are needed between the inner arm-assemblage 1 and the end-effector platform 41. The end-effector platform 41 here comprises the end-effector beam 41A. An end-effector platform may be used for a robot arm with five or six DOF. The robot described in WO2014187486 needs three links between its first arm and end-effector. Further one difference in relation to WO2014187486 is the use of a beam 25 to obtain pre-stress on the links 17 and 18. This will also make it possible to use ball- and socket joints between the outer pair of links 17, 18 and the inner pair of links 11, 12. Moreover, the proposal in FIG. 4 of WO2014187486 needs two arms (linkages) and not only one arm, thus the inner arm-assemblage 1 as in the present disclosure. That is, a robot according to WO2014187486 requires much more space for the arm system. The robot structure of this invention does not have these shortcomings of WO2014187486 since it can work with three DOF in the joint connecting the one (and only) inner arm-assemblage (hollow link 1A) corresponding to the first arm in WO2014187486 to the outer arm-link corresponding to the first rod in WO2014187486. Such a solution is not possible in the slim structures of WO2014187486 since then the end-effector would lose one constraint and not be controllable with an added degree of freedom between the first arm and the first rod. In FIG. 4 of WO2014187486 there is a structure that is not slim and that requires a large space for the arm system, but which may have a joint that can have three DOF between the first arm and the first rod. However, it is not possible to obtain a slim compact robot structure with the proposed solution in FIG. 4 of WO2014187486 because the vertical movements can in that case only be performed by a separate kinematic chain connected directly to the end-effector platform as in the delta robot case, and thereby requiring lot of space for the arm structure. Hence, the robot structure according to WO2014187486 can only control three DOF with the actuators fixed to the stand.

It should be mentioned that the bearings 19, 20, 21 and 22 of FIG. 2A could be replaced by pairs of bearings according to the assembly of bearings 16A and 16B in FIG. 2B. Vice versa, the bearing pair 16A and 16B may be replaced by a single bearing. The use of bearing pairs will give higher stiffness or makes use of more light weight bearings possible. Beside ball bearings, also sliding bearings could be used, for example in carbon.

With the design as described and when the angle between inner arm-assemblage 1 and actuating link 18 is 90 degrees, an infinitesimal rotation of the output shaft of first actuator 4 will move the tool 28 sideways in the horizontal plane and an infinitesimal rotation of the output shaft of second actuator 5 will move the tool 28 in or out in the horizontal plane. An infinitesimal rotation of the output shaft of third actuator 6 will move the tool 28 up or down. All movements in the whole workspace will moreover be made with the axis 32 vertical and the tool 28 will have constant tilt angles. Thus, the robot arm 500 will have the same movement features as the three main axes of a so-called SCARA robot. But in contrast to a SCARA robot, all the actuators 4, 5, 6 can be fixed to the robot stand (not show) and therefore an extremely light weight robot arm can be implemented. The robot stand is a rigid mechanical structure, on which the actuators are rigidly mounted. The robot stand may in this case be made as a fork with one part holding first actuator 4 and another part holding second and third actuators 5 and 6. The robot stand can either be rigidly mounted on the floor, on a wall or in a ceiling or on another robot arm.

Thus, the disclosure includes a robot arm 500 for positioning an end-effector 28 in three degrees of freedom, with constant tilt angle. This second aspect of the disclosure is disclosed at least in the FIGS. 2A, 2B, 3A, 4B, 10A, 10B, 12A, 12B, 14A and 14B, and in the description describing these figures, or at least aspects of these figures. The robot arm comprises the end-effector platform 41 arranged for receiving the end-effector. The robot arm comprises the first actuator 4 configured to rotate an inner arm-assemblage 1 about a first axis of rotation 29, 29A. The inner arm-assemblage 1 is connected to an outer arm-linkage 17, 18 pivotably arranged around a second axis 40 of rotation. The outer arm-linkage comprises an outer pair of parallel links 17, 18 being connected via end-effector bearings 19, 20 to the end-effector platform 41, thereby forming a first kinematic chain from the first actuator to the end-effector platform. The robot arm 500 also comprises a second actuator 5 configured to rotate the outer arm-linkage 17, 18 around the second axis of rotation 40, the outer-arm linkage 17, 18 being connected via universal joints including connection bearings 21, 22 to an inner arm-linkage comprising an inner pair of parallel links 11, 12; 811, 812 (811, 812 see FIG. 12B), thereby forming a second kinematic chain from the second actuator to the end-effector platform. The robot arm 500 also comprises a third actuator 6 configured to rotate a shaft 3 around a third axis of rotation 33 such that the outer arm-linkage 17, 18 is rotated around the third axis of rotation via an elbow joint 161, thereby forming a third kinematic chain from the third actuator to the end-effector platform.

According to some embodiments of the second aspect, the end-effector bearings 19, 20 are hinge joints with rotation axes 36, 37 that are parallel to each other.

According to some embodiments of the second aspect, the elbow joint 161 comprises a hinge joint with an elbow rotation axis that intersects with the second axis of rotation and with the third axis of rotation.

According to some embodiments of the second aspect, the elbow joint 161 is connected to an actuating link 18 being the one of the links of the outer pair of parallel links 17, 18 that is connected to the elbow joint 161.

According to some embodiments of the second aspect, the actuating link 18 is equipped with at least one link bearing 16C mounted along the actuating link for accepting rotation of the actuating link ends relative to each other.

According to some embodiments of the second aspect, the rotation axis of the link bearing 16C coincides with a rotational centerline of the actuating link 18.

According to some embodiments of the second aspect, the second actuator 5 is configured to move the inner pair of parallel links 11, 12 via inner connection joints 9, 10 connected to the inner pair of parallel links 11, 12.

According to some embodiments of the second aspect, the second kinematic chain is configured to transmit the rotation of a lever 2 to a corresponding movement of the end-effector platform 41.

According to some embodiments of the second aspect, the outer pair of parallel links 17, 18 and the inner pair of parallel links 11, 12 are connected by means of one connection bearing 21, 22 for each link connection of the respective links 11, 17; 12, 18. The rotation axes 34, 35; 31 of the connection bearings 21, 22 are at a right angle to a rotational centerline along the link for each respective link of the outer pair of parallel links 17, 18.

According to some embodiments of the second aspect, the robot arm 500 comprises a rigid beam 25 connecting the connection bearings 21, 22 mechanically with each other.

According to some embodiments of the second aspect, the inner pair of parallel links 11, 12 is mounted via ball- and socket joints 13, 14 on offset beams 23, 24 to the rigid beam 25.

According to some embodiments of the second aspect, the shaft 3 is connected between the third actuator 6 and an actuating link 18 of the outer pair of parallel links 17, 18 via the elbow joint 161.

According to some embodiments of the second aspect, the robot arm comprises end-effector bearings 19, 20 connecting the outer pair of parallel links 17, 18 and the end-effector platform 41. The rotation axes 36, 37 of the end-effector bearings are perpendicular to the rotational centerline of each link of the outer pair of parallel links.

According to some embodiments of the second aspect, the rotation axes 36, 37 of the end-effector bearings 19, 20 are parallel with the rotation axes 34, 35 of the connection bearings 21, 22.

According to some embodiments of the second aspect, the robot arm comprises connection bearings 21A, 22A (21A in FIG. 3D, 22A corresponding to 21A but in the connection bearing 22) connecting the links of the outer pair of parallel links 17, 18 and the links of the inner pair of parallel links 11, 12. A rotation axis of each connection bearing 21A, 22A coincides with the rotational centerline of the respective link of the outer pair of parallel links 17, 18.

According to some embodiments of the second aspect, the inner arm-linkage comprises a backhoe mechanism 803, 10B, 802, 8, 9C/10C, 805/806 that rotates the outer arm-linkage 804, 17, 18 around the second axis of rotation 40, where the backhoe mechanism connects to the outer pair of parallel links 17, 18 via the connection bearings 21, 21 that permit rotation around an axis 31 that is parallel with the second axis of rotation 40. See FIGS. 14A, 14B for 803, 10B, 802, 8, 9C/10C, 805/806. By proper dimensions that the skilled person can find out from FIG. 14B, the rotational axis 31 can be placed such that it does not intersect with any of the rotational axes of the two links of the outer pair of parallel links. The backhoe mechanism can be configured (see FIGS. 14A and 14B) to radically increase the operational range for the second kinematic chain, even to more than 180 degrees; a larger workspace without any singularities can then be provided.

According to some embodiments of the second aspect, the links of the inner pair of parallel links 11, 12 comprises pairs of parallel links 11A, 11B; 12A, 12B. Theses pairs of parallel links 11A, 11B; 12A, 12B are mounted with ball- and socket joints on each side of the links of the outer pair of parallel links 17, 18.

According to some embodiments of the second aspect, the inner arm-assemblage 1 comprises an arm link 1A that is hollow and the shaft 3 mounted axially with bearings inside the hollow arm link 1A. The shaft 3 is arranged to be rotated by means of the third actuator 6.

FIG. 3A illustrates a first embodiment of the robot arm 500 that enables the tool 28 to be actuated to rotate around an axis perpendicular to the horizontal plane. The reference numbers for common features amongst the different embodiments are the same and reference it thus made to the other figures, e.g. FIGS. 1, 2A, and 2B, for their explanation. In this first embodiment, a rotary gear transmission 64A, 64B with a gear factor bigger than one is outlined to obtain the targeted tool rotation. It is also shown how the rotary gear transmission is actuated via a mechanical transmission from a rotary fourth actuator 50 to a lever 61 on the largest gear wheel 64B of the rotary gear transmission. The robot arm 500 in FIG. 3A thus comprises the fourth actuator 50. A fourth kinematic chain is configured to transmit a movement of the fourth actuator 50 to a corresponding movement of a tool 28 mounted to the end-effector platform 41, here comprising parts 41A, 68, 69, 70. The fourth kinematic chain comprises an orientation linkage 52, 57 mounted to the inner arm-assemblage 1 via at least one bearing 53, 55. An orientation transmission 64A, 64B is mounted to the end-effector platform 41 and the orientation linkage is connected to the orientation transmission 64A, 64B via an end-effector rotation link 59 with a joint 58, 60 of at least two DOF at each end. FIG. 3A shows one option to obtain also axis four of a SCARA robot with all actuators fixed mounted on the robot stand. The four actuators 4, 5, 6 and 50 have coinciding rotation shafts along the vertical first axis of rotation 29. The output shaft of the fourth actuator 50 goes through the hollow shaft actuator 50 and is connected to the inner arm-assemblage 1, in the same way the output shaft of third actuator 6 goes through the second actuator 5 and controls the rotation of the shaft 3 via a 90 degrees angle gear (not visible in the figure). The second actuator 5 controls the lever 2 and the fourth actuator 50, which is used to rotate the tool 28 around the vertical axis 71, engages the shaft 52 by means of the 90 degrees angle gear 51 (the same type as the one used between third actuator 6 and the shaft 3). In relation to FIG. 2A, there are the following new features in this implementation of the robot arm, some also referring to the embodiments in FIG. 1:

The links 17 and 18 of the outer arm-linkage are connected directly to the links 11 and 12 of the inner arm-linkage using universal joints as connection bearings 21, 22. These joints are identical and illustrated in detail in FIG. 3D. Regarding the universal joint denoted 21, illustrated in FIG. 3D, the bearing 21A is mounted around the first link 17, having its axis or rotation coinciding with the center of the link. The bearings 21B and 21C, with its coinciding rotation axes perpendicular to the rotation axis of bearing 21A, are mounted on the outer ring of bearing 21A by means of the shafts 21D and 21E. In other words, the outer arm-linkage and the inner arm-linkage are connected by means of one connection bearing 21, 22, here universal joints, for each link connection of the respective links 11, 12, 17, 18. The rotation axes 34, 35 of these connection bearings 21, 22 are at a right angle to a respective link 17, 18 of the outer arm-linkage.

The outer rings of the bearings 21B and 21C are then mounted on the beam 21H using the rods 21F and 21G. The rod 21H is then mounted on the first link 11. It is also possible to add a bearing with its rotation center coinciding with the center axis of first link 11 between the beam 21H and the first link 11 but this is not necessary. Regarding the universal joint denoted 22, the bearing 21A is mounted around the actuating link 18, having its axis or rotation coinciding with the center of the link. In other words, the connection bearings 21A, 22A connecting the links 17, 18 of the outer arm-linkage and the links 11, 12 of the inner arm-linkage, where a rotation axis of each connection bearing 21A, 22A coincides with the center of the respective link 17, 18 of the outer-arm linkage.

The rod 21H is then mounted on the second link 12. It is also possible to add a link bearing with its rotation center coinciding with the center axis of second link 12 between the beam 21H and the link 12 but this is not necessary. The joints 21 and 22 should be mounted on the links 17 and 18 such that the distance between the centers of the joints 15 and 21 is the same as the distance between the centers of joints 16 and 22. In comparison with the solution in FIG. 1 to connect the inner pair of links 11, 12 to the outer pair of links 17, 18, this solution has the advantage that the mechanical system will be not redundant, making assembly easier. However, simultaneously the bearing 21A will get a large diameter when large diameter links are used, and it will be more difficult to replace a bearing 21A at malfunction. Then, of course, the pre-stress of the links 17 and 18 will not take place. Of course, the connection with the beam 25 and the bearings 21 and 22 can be used also in the 4-axis robot arm in FIG. 3A.

Because of the bearing arrangement in joint 22, the actuating link 18 is now allowed to rotate around its center axis also to the right of joint 22, and the link bearing 16C can be placed anywhere along an actuating-axis centerline along the actuating link 18, for example at the end of actuating link 18 on the joint 20 as specifically depicted here in FIG. 3A. More generally, this actuating-axis centerline may deviate from the actuating link 18, in theory if it is parallel with the centerline or bearing 22A (i.e., like bearing 21A but for joint 22, see FIG. 3D), but in practice considering dynamic forces it should also intersect with rotational axis 33. That is, the actuating-axis centerline does not necessarily intersect with rotational axis 40, although it does so in FIG. 3A.

To rotate the tool 28 around the axis 71, being the vertical axis of the tool 28, the lever arm 57 is mounted on the shaft 52 to swing in a vertical plane. In this way the end-effector rotation link 59 will rotate the gear 64B by means of the lever 61. The gear 64B will in turn rotate the gear 64A (i.e. the gear wheel or teeth wheel) and with a gear factor bigger than for example three, it will be possible to rotate the tool 360 degrees and more. Thus, the gear transmission 64A, 64B may include a first gear wheel 64A arranged for rotating the tool 28 in one degree of freedom. The shaft 52 is mounted through the bearings 53 and 55, which in turn are mounted by means of the rods 54 and 56 on the inner arm-assemblage 1. The lever arm 57 is favorably mounted on the shaft 52 at a right angle and end-effector rotation link 59 is mounted on the arm 57 with a ball- and socket joint 58. In its other end the end-effector rotation link 59 is mounted on the lever 61 also with a ball and socket joint 60. In other words, the robot arm 500 comprises an orientation transmission 64A, 64B, 100, 270, 271 including a second gear wheel 64B, and the first gear wheel 64A is engaged by the second gear wheel 64B which is arranged to be rotated by the end-effector rotation link 59 via a lever 61 connected to the second gear wheel 64B. Of course, all ball- and socket joints in the figures can be replaced by universal joints of two or three DOFs, even if such implementations often require more space and weight. The second gear wheel 64B is mounted on the outer ring of the bearing 63, which in turn is mounted with its inner ring on the vertical shaft 62, mounted on the end-effector beam 41A. The second gear wheel 64B engages the smaller first gear wheel 64A, which is mounted on the vertical shaft 65, arranged axially through the beam 68 that is hollow. The shaft 65 is thus rotatably arranged inside the hollow beam 68. Thus, in other words, the first gear wheel 64A is mounted to the end-effector platform 41 in such a way that the rotation axis 71 of the first gear wheel 64A is parallel with the first axis of rotation 29. The shaft 65 is supported by the bearings 66 and 67, which in turn are mounted on the beam 68. The beam 68 is mounted on the end-effector beam 41A by means on the rods 69 and 70. At the end of the rotating shaft 65 the tool 28 is mounted, either manually screwed to an end flange (on shaft 65, not shown) or by means of a tool exchanger on that end flange such that tool replacement can be automated.

The same kinematic requirements as in FIGS. 1 to 2B are valid when applicable in FIG. 3A. For example, all the axes 29, 30, 31, 32 and 40 should be parallel and vertical and for FIG. 3A this is also required for axis 71, which is defined by the rotation center of the shaft 65. The links 17 and 18 of the outer pair of links should be parallel and of the same length and the same for the links 11 and 12 of the inner pair of links. Notice that joint 9 (FIG. 2A) and part of first link 11 are hidden behind the inner arm-assemblage 1 in FIG. 3A. In WO201418748 there is no solution to obtain tool rotation. FIG. 1 in WO2015188843 includes an arrangement for rotating a tool mounted on the end-effector platform of a robot with three arms. This robot arm system needs a huge space and the 4:th axis is implemented to tilt the tool. The tool rotation is here made with a separate rotating actuator mounted on the wrist. Moreover, the workspace of the robot is very small and it is further reduced by the transmission to the wrist axes. In the solution of FIGS. 1 and 3A of this disclosure, the rotating shaft 3 with the lever arm 57 connected to the lever arm 61 via the end-effector rotation link 59 makes it possible to have full working area of the fourth axis in the whole positioning workspace of the robot arm. This is not possible with the transmission type for axis four in WO2015188843 since here the transmission working range will get an increasing offset the further the wrist is moved away from the center of the workspace. Another problem with the transmission solution in FIG. 1 of WO2015188843 is that the gears needed in the wrist will be close to the motor for axis six and thus to the tool, giving a clumsy end-effector platform, meaning accessibility problems. As can be seen from FIG. 1 and FIG. 3, the bearings are far away from the tool, thanks to the design of the robot arm with the beam 68 always vertical and separating the gear side from the tool side.

Thus, in the present disclosure the restrictions of WO2015188843 are avoided by mounting two serially working transmissions for tool rotation, thus the orientation linkage and the orientation transmission, on one kinematic chain only and by using a fourth actuator 50 connected to a gear transmission 64A, 64B on the end-effector platform 41 via a second rotating shaft 52 with a lever arm 57 connected to the gear transmission via an end-effector rotation link 59 with joints of at least 2 DOF e.g. in each end, whereby optimal transmission efficiency is obtained between the fourth actuator 50 and the orientation transmissions 64A, 64B. Moreover, two versions of orientation transmissions are introduced, one with gear wheels and one with a rack- and pinion, both able to obtain tool rotation capability of +/−180 degrees.

Figure 3B:
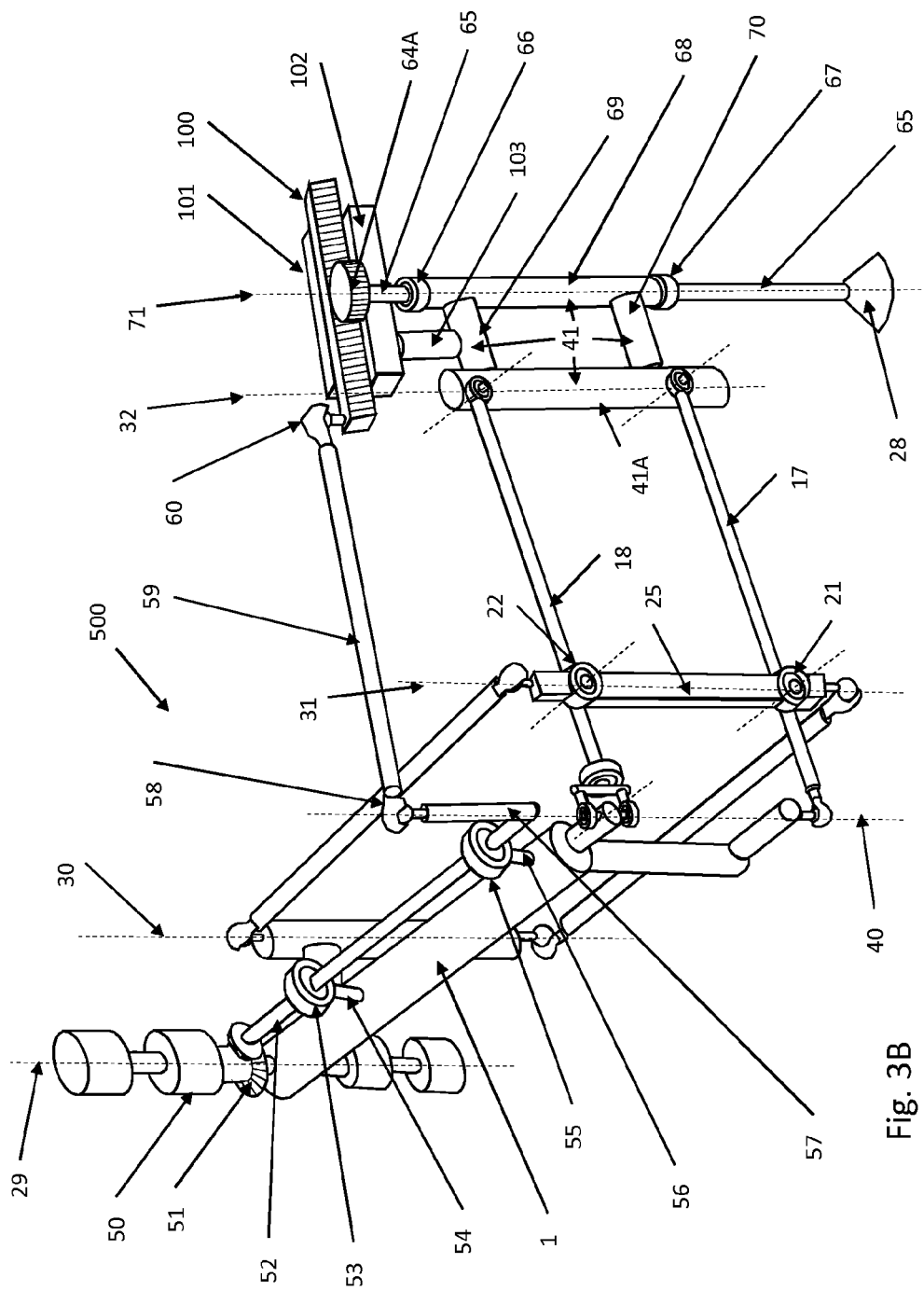
FIG. 3B illustrates an industrial robot arm according to a second embodiment, including an alternative gear transmission to rotate the end-effector.

FIG. 3B illustrates a robot arm 500 according to a second embodiment, including an alternative orientation transmission to rotate the tool 28 compared to the transmission in FIGS. 1 and 3A. In this embodiment a rack- and pinion transmission 100, 64A is used, where the gear wheel 64A in the shape of a pinion rotates the tool 28. A rack 100 of the transmission 100, 64A is moved by an end-effector rotation link 59, connected to a fourth actuator 50 via a mechanical transmission. In other words, a first gear wheel 64A is engaged by a rack 100, which is arranged to be moved by the end-effector rotation link 59 connected to the rack 100. The basic 3 DOFs robot structure with the beam 25 and the bearings 21 and 22 is the same as in FIG. 1 and the transmission for tool rotation with the shaft 52, the lever arm 57 and the end-effector rotation link 59 is the same as in FIGS. 1 and 3A. The new part in this implementation is that the rotating gear wheel 64B in FIGS. 1 and 3A has been replaced by a linear gear, the rack 100, to obtain a rack- and pinion transmission. The linear gear is moved by the end-effector rotation link 59 via the ball-and socket joint 60. The rack gear is moved in a linear bearing, outlined by references 101 and 102, which is mounted on the rod 69 via the rod 103. As in FIGS. 1 and 3A, the rod 69 together with the rod 70 are used to mount the beam 68 on the end-effector beam 41A of the end-effector platform 41. Also, as in FIGS. 1 and 3A, the pinion gear wheel 64A is mounted on the rotating shaft 65 to rotate the tool 28.

The advantage of using the rack- and pinion solution in FIG. 3B in relation to the gear wheel solution in FIGS. 1 and 3A is that it will be possible, in the workspace, to keep the end-effector rotation link 59 closer to the vertical plane defined by the parallel links 17 and 18 of the outer pair of links. This will further increase the efficiency of the transmission between the rotation of the shaft 52 and the shaft 65. Moreover, this solution will give a somewhat slimmer end-effector platform arrangement.

FIG. 3C illustrates an orientation linkage according to some embodiments. This orientation linkage illustrates that it is possible to distribute the degrees of freedom of the joints 58 and 60 into the lever 57, the link 59 and the lever 61. Thus, the bearing 58A is mounted in the lever 57 with a rotation axis coinciding with the center axis of the lever 57, the bearing 58B is mounted with its rotation axis perpendicular to that of bearing 58A and the bearing 58C is mounted with its rotation axis coinciding with the center axis of the link 59. The bearing 60A is perpendicular to the center axis of the link 59 and the bearing 60B coincides with the center axis of lever 57.

FIGS. 1 to 3D illustrate how the robot arm 500 can be designed to obtain the same motion features as a SCARA robot but with much lower inertia of the arm structure since all the actuators are fixed to the robot stand.

Figure 4A:
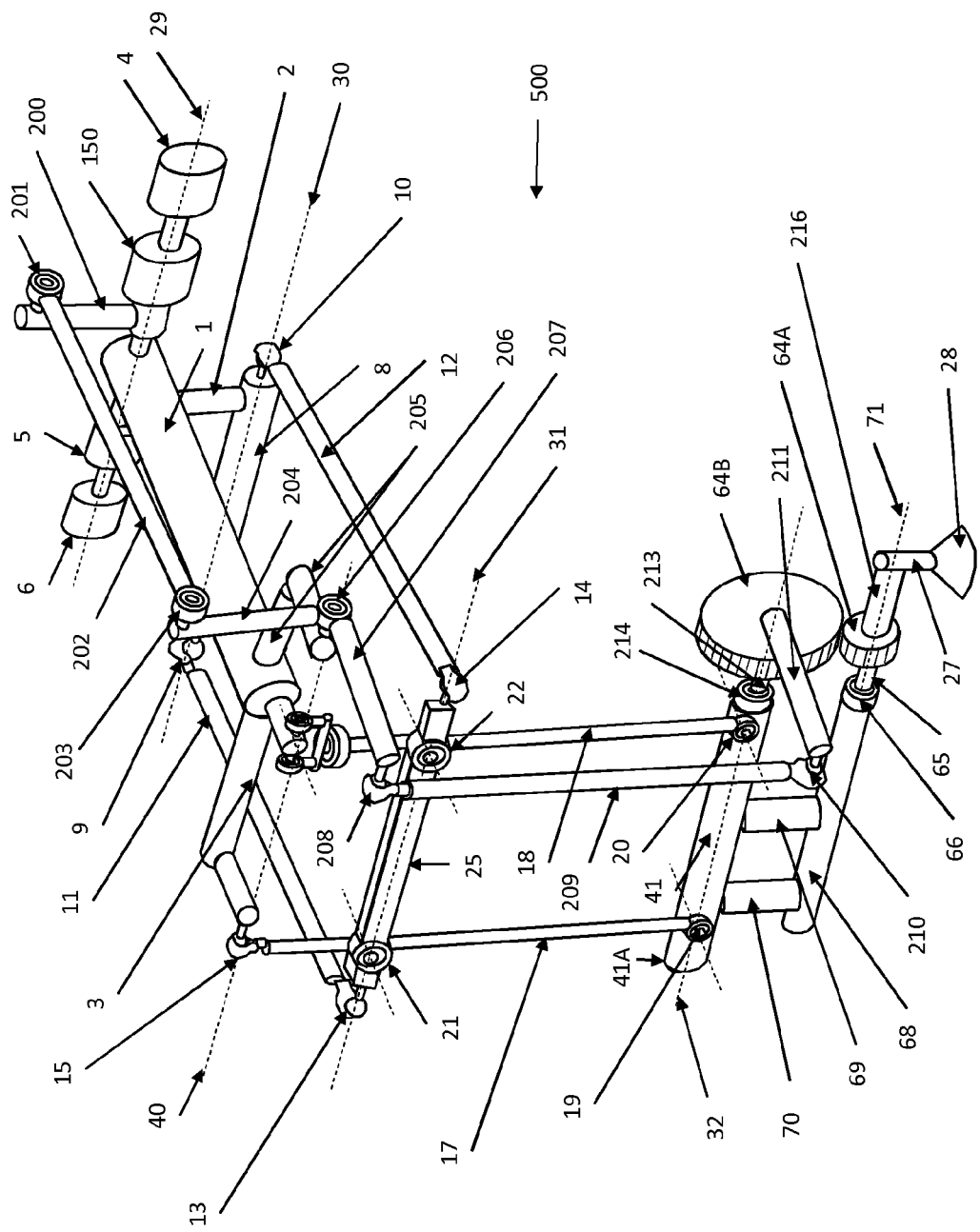
FIG. 4A illustrates an industrial robot arm according to a third embodiment, where the main structure is arranged with a horizontal common rotation axis of the rotary actuators.

FIG. 4A, illustrating a third embodiment of the robot arm 500, it is shown that the robot arm can also be implemented as an articulated robot arm reaching objects from above. This means that the structure of the robot arm will instead of swinging in a horizontal plane, swings in a vertical plane. This means that all the axes that had to be vertical in FIGS. 1 to 3 will now have to be horizontal. However, most of the design features from FIGS. 1 to 3 can still be used. Thus, looking at FIG. 4A, the only new design principles to be exemplified besides working with horizontal instead of vertical axes 29, 30, 31, 32, 40 and 71, are for the transmission to the gear wheel 64B. Of course, the same transmission principle as in FIGS. 1 and 3A can also be used in this case and the transmission principle of FIG. 4A can also be used in FIGS. 1 and 3A.

Looking at the actuators, the hollow shaft actuator of FIG. 4A, i.e. the second actuator 5, is arranged to swing the lever 2 to swing the outer pair of links 17 and 18 in and out, the third actuator 6 with its output shaft going through second actuator 5, is arranged to rotate the shaft 3 via a 90 degrees gear to swing the outer pair of links 17 and 18 sideways. The first actuator 4 with the output shaft going through a fourth actuator 150 is arranged to swing the inner arm-assemblage 1 and thus the outer pair of links 17 and 18 up and down. The new feature for this embodiment of the robot arm 500 in FIG. 4A is an alternative fourth actuator 150, a hollow shaft actuator which is arranged to swing a first lever 200. This first lever 200 is connected to the rotating gear 64B by two links 202 and 209, included in an orientation linkage. One link 202 is in one end mounted with a bearing 201 on the lever 200 and with another bearing 203 on a second lever 204. The second lever 204 is mounted on the outer ring of bearing 206, which in turn is mounted with its inner ring on the inner arm-assemblage 1 via the protrusion 205. On the outer ring of bearing 206 is also a third lever 207 mounted, in such a way that when the tip of the second lever 204 moves in a horizontal direction, the tip of the third lever 207 moves in a vertical direction. The rotation axis of the bearing 206 coincides with the axis 40, which gives the simpler kinematics for the transmission to the gear wheel 64B. The tip of the third lever 207 is connected to the other link 209 via the ball- and socket joint 208 and the other end of the other link 209 is connected to a fourth lever 211 via the ball- and socket joint 210. It should be noted that the bearings 201 and 203 could be replaced by ball and socket joints. Now, when swinging the first lever 200, the fourth lever 211 will swing up and down (vertically) and the gear wheels 64A, 64B will rotate back and forth, around their axes of rotation, along with the vertical swinging of the fourth lever 211. In this figure the second gear wheel 64B is mounted on the end-effector beam 41A via the shaft 213 and the bearing 214. To keep a constant tilt angle of the tool 28 or in order to control the tilt angle of the tool 28 to a targeted angle, a rotary gear transmission 64A, 64B on the end-effector platform 41 is used here as in FIGS. 1 and 3A. However, the gear wheels of the transmission are here vertically arranged, instead of horizontally as in FIGS. 1 and 3A. Thus, the rotary gear transmission 64A, 64B is controlled by the rotary fourth actuator 150 via an arrangement of the links 202, 209 and the levers 200, 204, 207. As in FIGS. 1 and 3A, rotating the second gear wheel 64B will rotate the first gear wheel 64A with a gear magnification ratio. First gear wheel 64A is mounted on the beam 68 via the shaft 65 and bearing 66. Rotating first gear wheel 64A implies that a shaft 216 holding gear wheel 64A rotates and the tool 27, 28 arranged on the shaft 216 will change its tilt angle (the shaft 216 is here the connection to the end effector). This will be useful, for example when picking and placing objects at different tilt conditions. It will also be used to keep constant tilt angle all over the workspace, for example when picking objects from a conveyor.

Figure 4B:
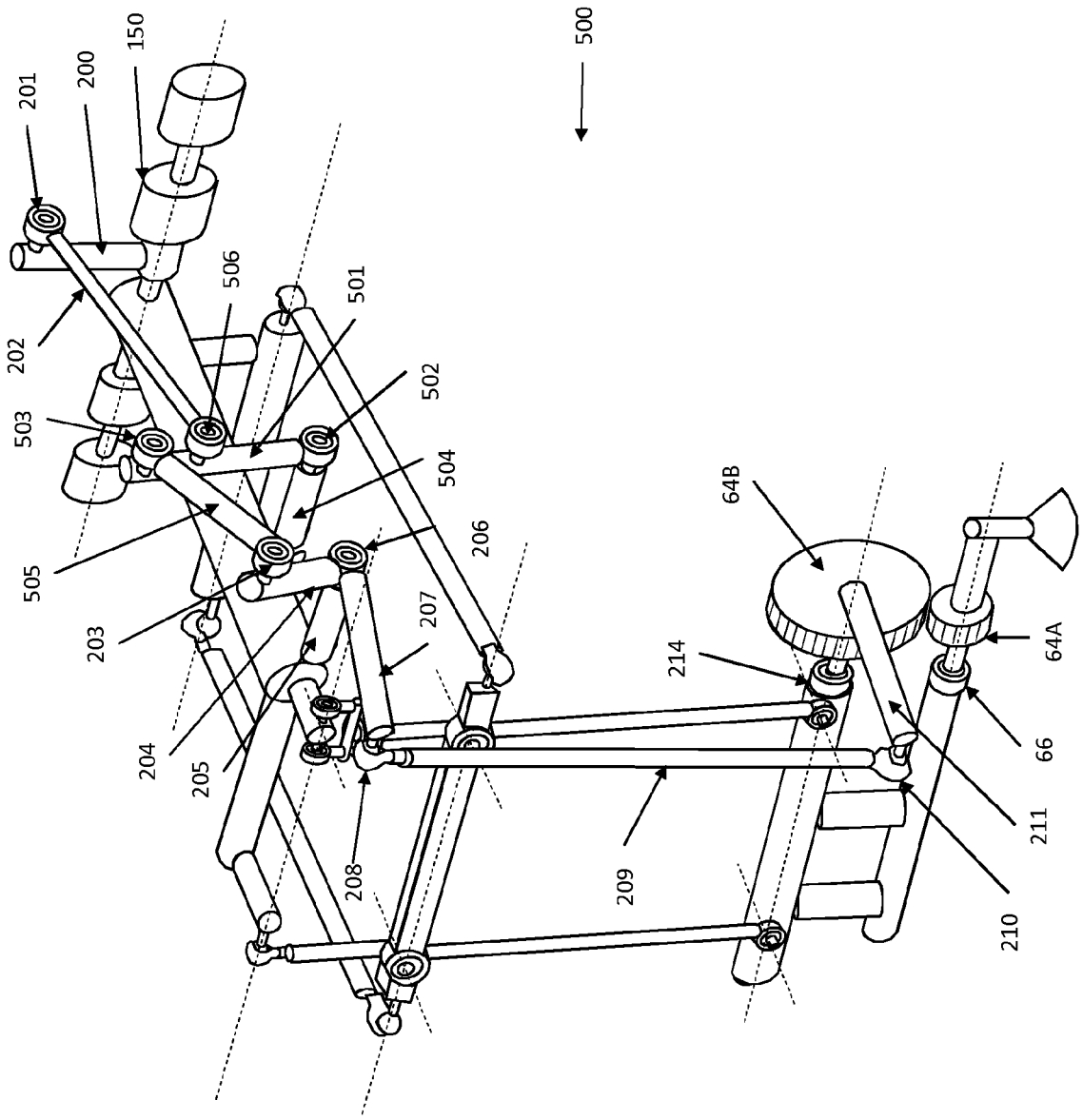
FIG. 4B illustrates an industrial robot arm according to a variant of the third embodiment

FIG. 4B illustrates a robot arm according to a variant of the third embodiment. With this variant, it is possible to increase the working range of the transmission between the levers 200 and 211, in comparison with the embodiment illustrated in FIG. 4A. Using the solution in FIG. 4B, the gear ratio of the gear transmission 64B-64A can be reduced and the rotation capability of the gearwheel 64B will be increased in the inner and outer parts of the work space of the robot arm. Here, an inner gearing mechanism comprising a backhoe linkage has been introduced, comprising an extra lever 501, which is longer than the lever 204. The levers 501 and 204 are connected by the link 505 with the bearings 503 and 203 at its ends. When the actuator 150 swings the lever 200, the link 202 with its bearings 201 and 506 in its ends, will swing the lever 501 around the bearing 502, which is mounted on the beam 504. By means of the backhoe principle the angular rotation of lever 204 will be larger than that of the lever 501 and the gear wheel 64B will get larger rotations than in the direct transmission in FIG. 4A. Thus, in other words, the inner gearing mechanism is arranged according to the backhoe principle for rotating the end-effector 28 within an angular range that is determined by the gear ratio of the inner gearing mechanism without being limited by the rotation of the outer arm-linkage. That is, without the backhoe, enabling a large angular range for the second degree of freedom easily leads to an undesired limitation of the working range of the fourth degree of freedom for large orientations around axis 40. This is avoided with the backhoe, which is a well-known mechanism for excavators and various types of cranes. As such, the standard backhoe principle can be applied to almost any lever-and-rod linkages within the present invention, which for brevity is not further commented or depicted. In comparison with FIG. 4A, the bearing 206 in FIG. 4B has an offset from the axis 40, which is of course not necessary but could make the mechanical design more efficient concerning forces and/or workspace.

In FIG. 4B there are thus two (2) steps with different principles to increase the magnification of the rotation ratio between the actuator 150 and the gear wheel 64A. Of course, the orientation transmission with the lever 211 and the gears 64A and 64B can also be used where the backhoe is implemented in FIG. 4B and vice versa. The same concept can be used for the transmission between actuator 150 and gear wheel 64A in FIG. 5A and between lever 351 and lever 362 in FIG. 10B (with notations as in FIG. 3D).

FIG. 4C illustrates a robot arm according to another variant of the third embodiment. According to this another variant, the actuators 4, 5, 6 and 150 are mounted on a bracket 510, which can be rotated by an actuator 512 connected to the bracket 510 by the shaft 511. The center line of the shaft 511 is at a right angle to the center line of the actuators 4, 5 6 and 150. Using the actuator 511, the agility of the robot arm will be increased and since the actuators 4, 5, 6 and 150 for the control of the robot arm are all located close to each other, the mass inertia to be rotated by actuator 512 will be small. Thus, the torque and power needed for actuator 512 will be much lower than for a conventional serial robot with the actuators distributed in the robot arm. It should also be mentioned that the bracket 510, according to one embodiment, can be mounted on a linear actuator to increase the work space. FIG. 4C also shows the option to use an actuator 514 for rotation of the tool 28. When the robot arm handles small objects with very low mass inertia, the actuator 514 will be lightweight and this solution could be an advantage because of lower mechanical complexity than the solution in FIG. 8 for rotation of the tool.

FIG. 4D illustrates an alternative solution with a belt drive, for transferring motion to the tool 28, where the gear wheel 64B of FIG. 4C has been replaced by a belt wheel 64C, and the gear wheel 6A has been replaced with another smaller belt wheel 64 E. A belt 64D connects the two belt wheels. Such a belt transmission can also replace the backhoe mechanism. Instead of belts also wires can be used between two wheels.

Generally, a link is used to transfer a force, and a lever is used to transfer a torque.

Instead of the gear wheel transmission 64A, 64B a rack-and pinion solution as in FIG. 3B can of course be used. Then the direction of the mounting of the rack could be as in FIG. 3B or with a right angle to the plane formed by the outer pair of links 17, 18.

In WO201418748 there is no solution to obtain an articulated robot reaching objects from above and no solution is shown to obtain a fourth axis to be able to tilt the tool or keep the tool tilting angles constant.

In several applications, there are requirements to both tilt and rotate the tool 28. One possibility for this is to mount a small actuator on a shaft 27 connected to the tool 28 in e.g. FIG. 4A to rotate the tool 28. This will add inertia and electrical wiring to the arm structure and to avoid this, a transmission solution with rack- and pinion is used as illustrated in FIG. 5A. The shaft 27 is then the connection to the end-effector. FIG. 5A illustrates the robot arm 500 according to a fourth embodiment, where the tool 28 is controlled to both rotate and tilt or to tilt with two DOF. In FIG. 5A, for efficient tool rotation with two DOF, a rack- and pinion arrangement 270, 271 is mounted to a rotating first gear wheel 64A and a rack 271 is connected to a transmission arrangement 264, 266 via a bearing 267 with its center of rotation coinciding with the center of rotation of the first gear wheel 64A carrying the rack- and pinion arrangement 270, 271. Implementing these features makes it possible to rotate the tool around two axes 90 degrees in relation to each other with +/−180 degrees. This is not possible with the arrangement described in FIG. 1 in WO2015188843. In more detail, the rack- and pinion gear 270 is connected to the tool 28 and is arranged to be rotated by the rotary gear transmission 64A, 64B, and the rack 271 of the rack- and pinion gear is moved via a bearing 267 and an arrangement of links 258, 264, 266 and levers 256, 260, 262.

The first gear wheel 64A is actuated in the same way as described for FIG. 4A but the first gear wheel 64A is now rotating the linear bearing assembly 270, 271, in which the rack 271 is sliding parallel to the rotation axis of gear wheel 64A. Thus, the robot arm 500 comprises at least two orientation transmissions 64A, 64B; 270, 271; 293, 294; 315, 316; 311, 312, 313 (see other figures too) mounted to the end-effector platform 41, comprising parts 41A, 68, 69, 70, and similar depending on embodiment of the orientation. A first gear wheel 64A of an orientation transmission is arranged to rotate at least one other orientation transmission 270, 271; 293, 294; 315, 316; 311, 312, 313 (see other figures too). As in FIG. 3B, the rack rotates the pinion gear, in this case denoted 270, to rotate the tool 28 via the shaft 65A (corresponding to 65 in FIG. 3B). In other words, at least one pinion 270, 294, 316 of the at least one other orientation transmission 270, 271; 293, 294; 315, 316; 311, 312, 313 is connected to the tool 28 to obtain tool rotation. In some embodiments, the robot arm comprises at least two orientation transmissions 64A, 64B; 270, 271; 293, 294; 315, 316; 311, 312, 313 mounted to the end-effector platform 41 and where an outer gearing mechanism 64B, 64A; 64C, 64D, 64E; 100, 64A; 271, 270 of one of the at least two orientation transmissions is arranged to rotate at least the other one of the at least two orientation transmissions 270, 271; 293, 294; 315, 316; 311, 312, 313.

The sliding movement of the rack 271 is accomplished by the bent rod 266 via the bearing 267. The bearing 267 should preferably have its axis of rotation coinciding with the axis of rotation of the gear wheel 64A. Then the linear bearing assembly 270, 271 can be rotated by the gear wheel 64A without any rotation or translation of the bent rod 266. In other words, at least one rack bearing 267 has its axis of rotation 71 coinciding with the axis of rotation 71 of the first gear wheel 64A.

The bent rod 266 is moved by the link 264 via the ball- and socket joint 265. The link 264 is mounted on the lever 262 via the bearing 263. A bearing 261 is mounted with its inner ring on the beam 269, which in turn is mounted on the shaft 62 coming out from the inner ring of the bearing 63 of the gear wheel 64B. The shaft 62 is mounted on the end-effector beam 41. The lever 260 is mounted on the outer ring of the bearing 261 as is also the case with the lever 262. When the tip of lever 260 is moved vertically, the tip of lever 263 moves horizontally, compare the arrangement with the previously described levers 204 and 207. The vertical movements of the tip of lever 260 are obtained from the vertical movements of the tip of lever 256 via the gear link 258. The gear link 258 is mounted with ball- and socket joints 257 and 259 on the tips of the levers 256 and 260. The lever 256 is mounted with about 90 degrees angle on the rotating shaft 261, compare the arrangement for the lever 57 in FIGS. 1 and 3B. Thus, rotating the shaft 251 will swing the lever 256 up and down and via the gear link 258, the two levers 260 and 262, the link 264, the rod 266 and the bearing 267, and move the rack gear 271 back and forth, giving rotations of the tool 28 at a tilting direction determined by the rotation angle of the gear wheel 64A. In other words, the robot arm 500 comprises an orientation linkage 251, 258, 264 including the rotating shaft 251 with the lever 256 in one end and where the lever 256 is connected to the gear link 258 via the joint 257 of at least two DOF. The shaft 251 is mounted on the bearings 253A and 253B. The bearing 253A is mounted on the inner arm-assemblage 1 via the beam 255 and the bearing 253B is mounted on the inner arm-assemblage via the shaft 269 of the bearing 206. The shaft 269 for bearing 253B is mounted on the inner arm-assemblage 1 via the protrusion 205. In the figure, the shaft 251 is arranged to be rotated by a fifth actuator 250. Thus, the robot arm 500 comprises a fifth kinematic chain configured to transmit a movement of the fifth actuator 250 to a corresponding movement of the tool 28 mounted to the end-effector platform 41 via the outer gearing mechanism, here comprising a first gear wheel 64A. The fifth kinematic chain comprises at least one rack bearing 267, 297 connected to the fifth actuator 250 via an orientation linkage 251, 258, 264. However, a fifth actuator with its axis of rotation coinciding with the first axis of rotation 29 could be used, connecting the shaft 251 to the fifth actuator via a 90 degrees angle gear as shown in FIGS. 1 and 3B. Of course, also a transmission chain arrangement as the one used for the rotation of the gear wheel 64B by fourth actuator 150 could be used to move the lever 260 up and down. The link chain arrangement for the rotation of the tool 28 can of course also be placed on the other side of the inner arm-assemblage 1 and then the linear bearing arrangement 270, 271 will be mounted on the shaft 65 to the left of the bearing 66 instead, making it possible to design a more compact solution. Moreover, the whole rack- and pinion arrangement could be placed to the left of the gear wheel 64A, but for the clarity of the figure this more compact solution is not shown. It is also possible to replace the gear wheel transmission 64A, 64B with a rack- and pinion arrangement as in FIG. 3B.

The transmission from actuator 150 to the lever mounted on gear 64B is different from the transmission from actuator 250 to the lever 260. However, it is possible to use the same transmission concepts in both cases. When the transmission concept used between the actuator 150 and the lever mounted on gear 64B is used, the backhoe linkage can be included. The same transmission concept as used between actuator 250 and the lever 260 in FIG. 5A is also used in the FIGS. 6A, 9 and 10A as will be illustrated in the following. Of course, these transmissions can be replaced by the type of transmission used from actuator 150 to the lever mounted on gear 64B in FIG. 5A and they can include the backhoe linkage described in FIG. 4B.

In FIG. 5B, illustrating an alternative embodiment of the rack 271, the rack 271 has been rotated 90 degrees, whereby the teeth point downwards. The connected pinion 270 now has a horizontal rotation axis and the shaft 65 is horizontal. The tool 28 is mounted at a right angle to the shaft 65A. As in FIG. 5A, the linear bearing assembly 273 for the rack 270 is mounted on the gear wheel 64A and the bearing 267 between the rack 271 and the transmission part 266 has its center of rotation coinciding with the center of rotation of the gear wheel 64A. This mounting of the rack- and pinion results in the possibility to control both tilting angles of the tool 28.

So far solutions for five axes robot control with all actuators fixed to the robot stand have been shown. To obtain six DOF, one solution is to use transmissions with rotating shafts, Cardan joints and 90 degrees gears as shown in FIGS. 6A and 6B.

FIGS. 6A and 6B illustrate a robot arm 500 according to a fifth embodiment, including a combination of the rack- and pinion concept according to FIGS. 5A and 5B, with a transmission including right-angle gears and Cardan joints 282, 280 is used to accomplish one further kinematic chain. That is, this one further kinematic chain is configured to transmit a movement from actuator 285 to a respective movement of the end-effector arranged onto the end-effector platform, which gives at least six degrees of freedom for the end-effector motion, still with all actuators fixed to the robot stand.

The robot arm 500 has here been split up in two figures in order to be able to illustrate in greater detail. FIG. 6A illustrates the transmission from a rotating actuator 285 with its right-angle gear transmission 299 to the horizontally rotating shaft 275 on the end-effector platform 41. To make this possible, the output from the right-angle gear transmission 299 rotates the shaft 284, which is mounted on the inner arm-assemblage 1 (mounting not shown). The shaft 284 engages the right-angle gear 283, the output of which is connected to a first Cardan joint 282 via a link 286, the first Cardan joint being mounted to have its center on the line 40. The output of the Cardan joint 282 rotates the shaft 281, which in its other end is connected to a second Cardan joint 280, via a link 279, the second Cardan joint 280 with its center on the axis 32. The output of the second Cardan joint 280 drives the right-angle gear 278, which in turn rotates the shaft 275. The shaft 275 is mounted with bearings inside the beam 68 and can freely rotate inside the bearing 66, which supports the first gear wheel 64A via the hollow shaft 65. The shaft 275 is also arranged to freely rotate inside the shaft 65 and the first gear wheel 64A. Thus, an orientation linkage comprising 284 and 286, and the orientation transmission comprising 281, 279 and 275, are arranged for rotating the end-effector around an orientation axis 71, which will be without rotational angular limits due to the free rotation inside shaft 65 and elsewhere is without stop.

FIG. 6B illustrates that the shaft 275 is connected to the right-angle gear 277, which on its output rotates the shaft 65B that can freely rotate inside the bearing of the pinion 290. The shaft 65B is connected to the last right-angle gear 288, which on its output is connected to the shaft 65C rotating the tool 28. Thus, the connection to the end-effector here comprises the shaft 65C. Also, one pinion 270 of the at least one second gear transmission 270/271 is connected to the tool 28 via a right-angle gear 288. The shaft 65C is connected to the pinion 270 via the bearing 291 and the beam 290. As in FIGS. 5A and 5B the rack- and pinion 270, 271 is arranged to be rotated by the first gear wheel 64A. The rotation centers of the output gear wheel of the right-angle gear 278, the shaft 275 and the input gear wheel of the right-angle gear 277 are on the common axis 71. The rack 271 is moved by the link 264, connected to the rack 271 via the beam 266, the rack bearing 267 and the rack attachment 287. As in FIG. 5A, the link 264 is connected to a link arrangement via a lever 262.

As can be seen from FIG. 6A, five right-angle gears and two Cardan joints are needed to obtain tool 28 rotation from the actuator 285 fixed to the robot stand. The advantage of this solution is the possibility to obtain infinite tool rotation angles and the disadvantage is the loss of positioning workspace because of the working range limitations of the Cardan joints 280 and 282.

By observing that shaft 275, in FIG. 6A, is a straight shaft (with some type of bearings 66) that is open at both ends, the skilled person will notice the similarity to outer robot arm segments of robots according to many existing products. This points directly at making shaft 275 hollow with other bearings 66 and another shaft 275 inside, and so on for a plurality of concentric shafts. It is common practice in the art to have three such concentric shafts. Such a plurality of concentric shafts 275 entering into the example wrist mechanism shown in FIG. 6B can then be used either for extending/revising that mechanism (in a variety of ways, not considered here), or for mounting an existing standard robot wrist into the positioning of the new end-effector platform according to the present disclosure. Considering the other end of the concentric shafts 275, with inner shafts protruding further out (to the left along centerline 71 in FIG. 6B), and for each shaft adding another right-angle gear 278, the remaining part (from right-angle gear 278 up to actuator 285) of the sixth kinematic chain can be duplicated, it follows that a plurality of kinematic chains can be added. The robot arm then comprises a plurality of orientation linkages 284, 286, each comprising an orientation transmission 281, 279, 275.

Furthermore, as another variation that the skilled person would find, the plurality of orientation linkages can be configured such that a corresponding plurality of concentric output shafts 275 can actuate several end-effector orientations not only for one but also for several end-effectors that are arranged onto the end-effector platform, for instance in different directions, or next to each other. Since many standard articulated robots, as indicated above, have wrist motors arranged at the back of their out arm link, with shafts in parallel or concentrically going through the outer-arm link to a wrist with 2 or 3 DOF, there is the option with the present invention to combine a 3 DOF SCARA-like motion according to FIG. 2A with a standard 3DOF robot wrist (instead of the mechanism shown in FIG. 6B, to use existing components/interfaces) that is actuated by a plurality of shafts 275 driven by a plurality of motors 285 that all are fixed to the robot stand. Arranging shafts 275 on a standard SCARA robot would require costly and heavy telescopic shafts to deal with the vertical placement of the wrist (and no useful 6 DOF SCARA exists), which contrasts with the present invention where the properties of the third kinematic chain enables a leaner solution.

Figure 7:
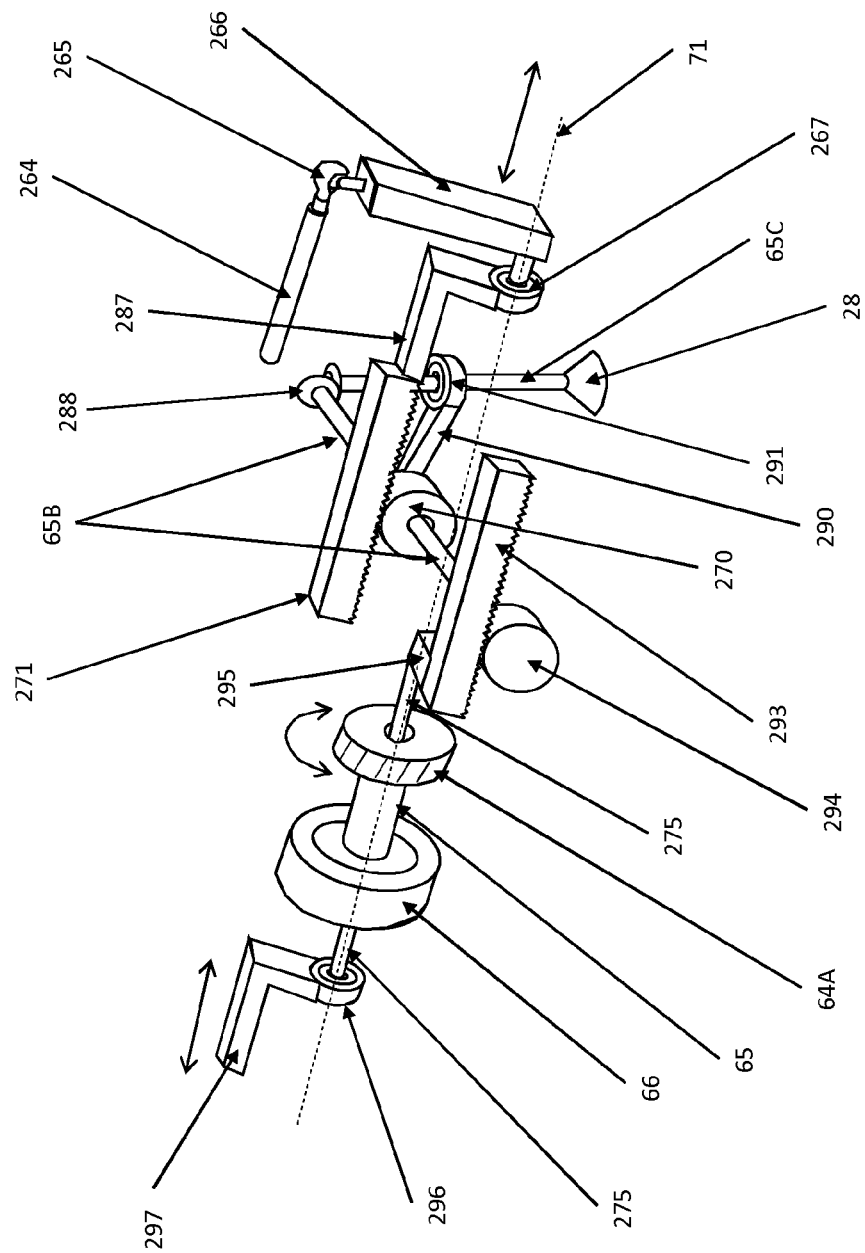
FIG. 7 illustrates an embodiment with two rack- and pinion arrangements to be rotated by a gear wheel in order to obtain six DOF with only one right-angle gear and no Cardan joints.

FIG. 7 illustrates an alternative example embodiment of the rack-and pinion arrangement illustrated in FIG. 6B, giving the possibility to obtain six DOF without the use of Cardan joints. Here a second or additional rack- and pinion arrangement 293, 294 is introduced, where the pinion 294 is used to rotate the tool 28 via a right-angle gear 288. Also, one pinion 294 of the at least one second orientation transmission 293/294 is connected to the tool 28 via the right-angle gear 288. The same principle as for the rack-and pinion arrangement 270 and 271 can be used to slide the rack 293, but the connection to a transmission to the actuator on the robot stand (not shown in the figure) is now instead made through the first gear wheel 64A. Thus, a link is connected to the beam 297 that will move by translation the shaft 275 back and forth via the bearing 296. The shaft 275 will move freely inside the bearing 66, the shaft 65 and the first gear wheel 64A and connect to the rack 293 via the beam 295. Both rack- and pinion arrangements will be mounted on the first gear wheel 64A, and as in FIG. 6B the shaft 65C is mounted via the bearing 291 and the beam 290 to the pinion 270. For clarity the linear bearings of the racks 271 and 293 are not shown, but these are mounted on a platform (not shown) to be rotated by the first gear wheel 64A. The pinions 270 and 294 are mounted with bearings on the same platform and the shaft 65 can rotate freely inside the bearing supporting the pinion 270. The right-angle gear assembly 288 is mounted (not shown) on the pinion 270. Thus, rotating the gear wheel 64A will rotate the tool (and the whole rack- and pinion transmissions) around the axis 71, moving the beam 266 will rotate the tool 28 around the center of the shaft 65, which is at a right angle of the axis 71 and moving the beam 297 will rotate the tool 28 around the rotation center of the shaft 65C.

One shortcoming with the arrangement in FIG. 7 is that a rotation of the tool 28 around the center of the shaft 65 will simultaneously rotate the tool 28 around the center of the shaft 65C because of the functionality of the right-angle gear 288. To avoid this, a third rack- and pinion arrangement can be introduced according to FIG. 8.

Figure 8:
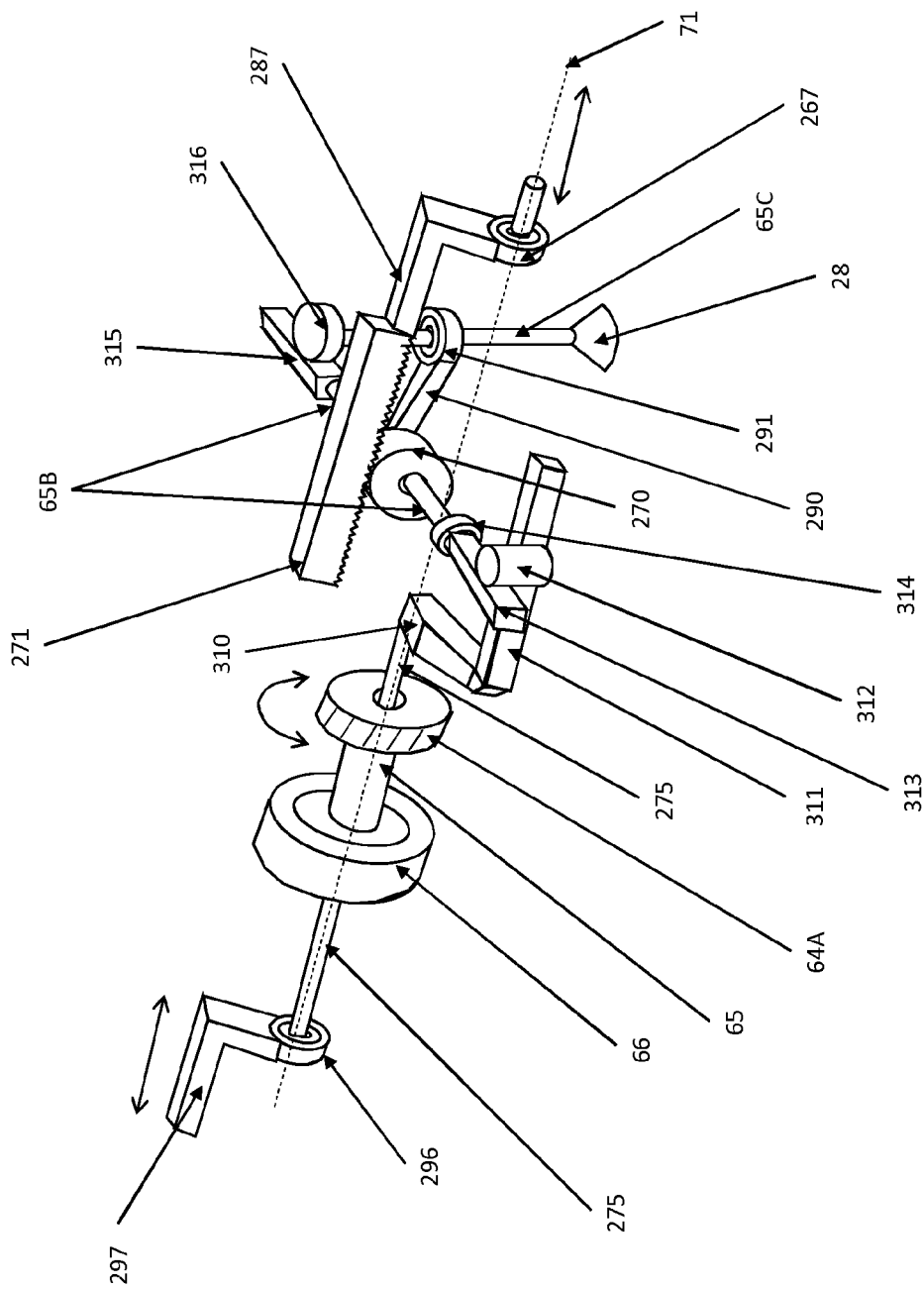
FIG. 8 illustrates an embodiment with three rack- and pinion arrangements to be rotated by a gear wheel to avoid right angle gears and Cardan joints in a six DOF robot arm.

FIG. 8 illustrates an embodiment with three rack- and pinion arrangements to be rotated by a gear wheel 64A to completely avoid right angle gears and Cardan joints in a six DOF robot. One of the rack- and pinion arrangements comprises two racks with a common pinion, where the racks are mounted at right angles relative each other. Here, the right-angle gear 288 of FIG. 7 has been replaced by a rack-and pinion arrangement 315, 316. The pinion 316 rotates the tool via the shaft 65C and the rack 315 is connected to the rack 313 via the shaft 65 and the bearing 314. The rack 313 shares the pinion 312 with the rack 311, which is connected to the shaft 275 via the beam 310. Thus, moving the beam 297 will move the shaft 275 via the bearing 296 and then the rack 311. Moving the rack 311 will via the pinion 312 move the rack 313 at a right angle to the movements of the rack 311. In other words, one rack- and pinion gear transmission 311, 312, 313 here comprises two racks 311, 313 connected via a common pinion 312 and the two racks 311, 313 are arranged to move at right angle relative to each other. Then the rack 315 will be moved by the freely moving shaft 65 via the rack bearing 314. In other words, the rack shaft 65 is arranged to move freely in an axial through hole of a pinion 270 belonging to another rack-and pinion transmission 270, 271. The rack 271 is moved in the same way as in FIG. 6B via the rack attachment 287 and the rack bearing 267. The two racks 313, 315 may be connected to each other via a rack shaft 65 and a rack bearing 314. Thus, this solution makes it possible to obtain six DOF movements of the robot arm 500 with all actuators on the robot stand and without any coupling between the rotation axes of the tool. In other words, the robot arm comprises at least one further actuator and at least one further kinematic chain configured to transmit a movement of the at least one further actuator to a corresponding movement of the end-effector arranged onto the end-effector platform, which gives at least six degrees of freedom for the end-effector motion. As can be seen in the figure, the shaft 65C, rotating the tool 28, is mounted on the lower side of the pinion gear wheel 316. However, it can as well be mounted on the upper side of the pinion 316 and it is also possible to have one tool mounted with a shaft on the upper side of pinion 316 and simultaneously have another tool mounted on the lower side of the pinion 316. The arrangement of FIG. 8 mounted on the main structure for axis 1-3 and with the orientation transmission 64A, 64B and with three (3) parallel link transmissions and actuators for axes 4-6 can be further developed to a 7 degrees of freedom robot by means of an actuator rotating the base with the actuators for axes 1-6. In applications with hygienic requirements or with dirty environment it is easier to protect the assemblies for the wrist Axes 4, 5 and 6 if only rotating sealing are used. To seal the arrangement in for example FIG. 5, a sealing for linear movements is needed for the rod 266. FIG. 9A, illustrating a robot arm 500 according to a sixth embodiment, shows a way to get around this problem since here only a rotating sealing are needed. The way to obtain this feature is to implement a second rack and pinion arrangement, where the racks are connected and where the pinions have different diameters giving a gear factor larger than one. With the same transmission design as in FIG. 5 from the fifth actuator 250 to the vertical movements of the link 258, the pinion gear 302 is rotated via the shaft 301 by the lever 300 with its tip mounted on the link 258 via the ball- and joint socket 259. Thus, the pinion 302 of the fixed rack- and pinion transmission 302, 307 includes the lever 300, on which a gear link 258 is mounted via a joint 259 of at least two degrees of freedom.

The pinion gear wheel 302 is mounted on the shaft 301, which is mounted in the inner ring of the bearing 303. The outer ring of bearing 303 is mounted with the beam 304 on the linear bearing assembly part 305, which in turn is mounted on the shaft 63 and thus firmly fixed to the end-effector beam 41. Thus, at least one rack bearing 267, 297 is connected to the fifth actuator 250 via a fixed rack-and pinion transmission 302, 307 mounted on the end-effector platform 41. When the pinion gear wheel 302 rotates, the rack gear will move horizontally and because of the rigid coupling obtained by the beam 308 also the rack gear 271 will move horizontally. The beam 308 is connected to the rack gear 271 via the shaft 309 and the bearing 267. Also, the rack bearing 267, 297 connected to the rack 307 of the fixed rack- and pinion transmission 302, 307. The shaft 309 is mounted in the inner ring of the bearing 267 and the outer ring of the bearing 267 is mounted on the rack gear 271. In one embodiment, the diameter of the pinion gear wheel 302 is about three times larger than the diameter of the pinion gear wheel 270 to obtain at least 360 degrees of rotation of the tool 28. Thus, FIG. 9A illustrates an alternative transmission to the link- and lever arrangement 260, 262, 264 in FIG. 5. Here a second rack- and pinion gear is connected in series with the rack- and pinion gear shown in FIG. 5. In this way a simpler arrangement of links and levers can be used with only one link 258 and two levers 256 and 300. Thus, the robot arm 500 comprises a fifth actuator 250 and a fifth kinematic chain configured to transmit a movement of the fifth actuator 250 to a corresponding movement of the tool mounted to the end-effector platform 41 via the first gear wheel 64A. The fifth kinematic chain here comprises at least one rack bearing 267, 297 connected to the fifth actuator 250 via a link transmission 251, 258, 264.

FIG. 9B illustrates an alternative orientation linkage according to some embodiments. The orientation linkage gives the option to use a 90 degrees gear 256A in order to rotate the axis 256B and lever 256 around an axis perpendicular to the center axis of the inner-arm assemblage 1. This will increase the working range of the transmission between the lever 256 and the gear transmission.

Figure 10A:
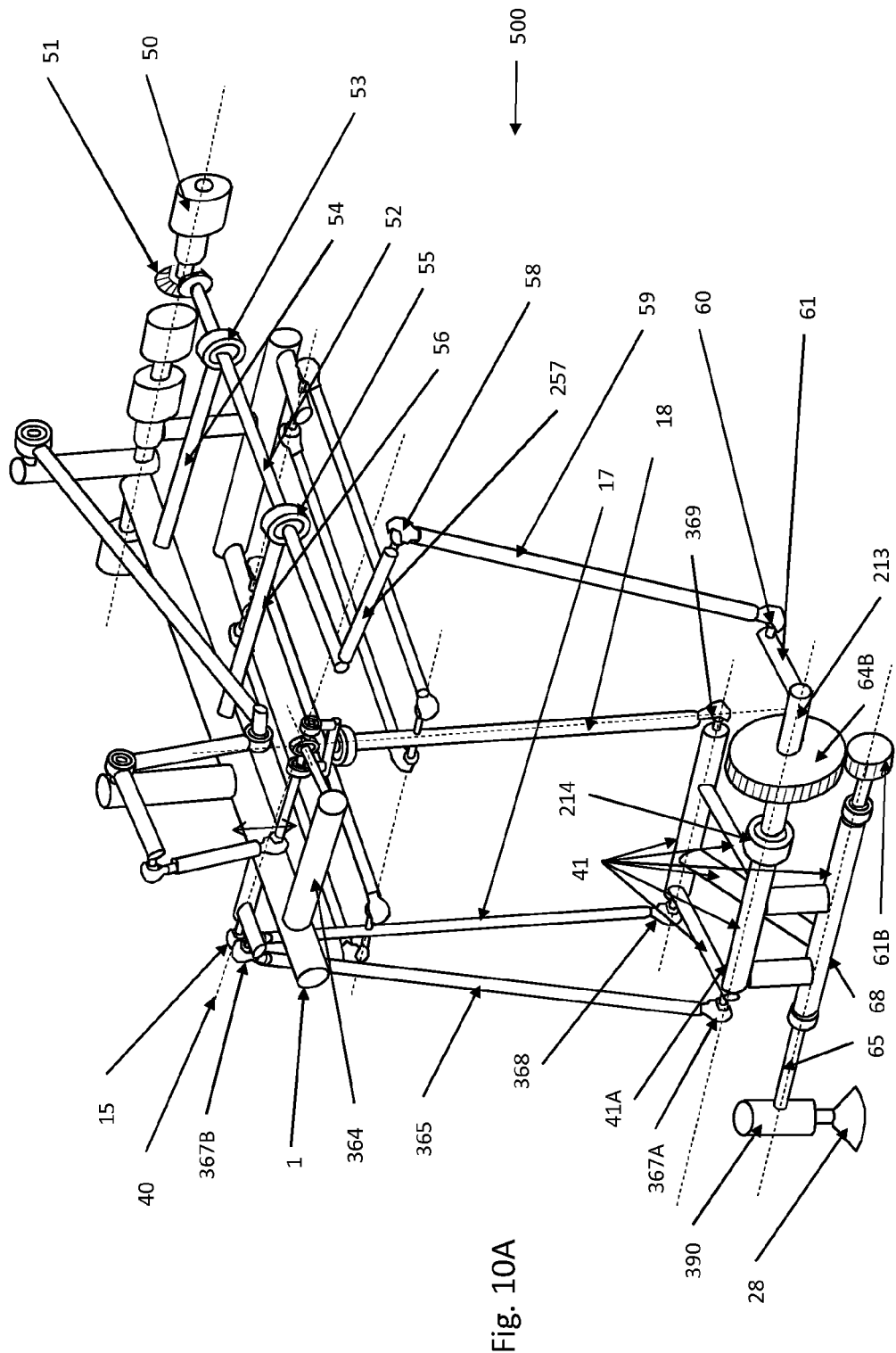
FIGS. 10A, 10B illustrate an industrial robot arm according to a seventh and eight embodiments with a horizontal common rotation axis of the rotary actuators.
Figure 10B:
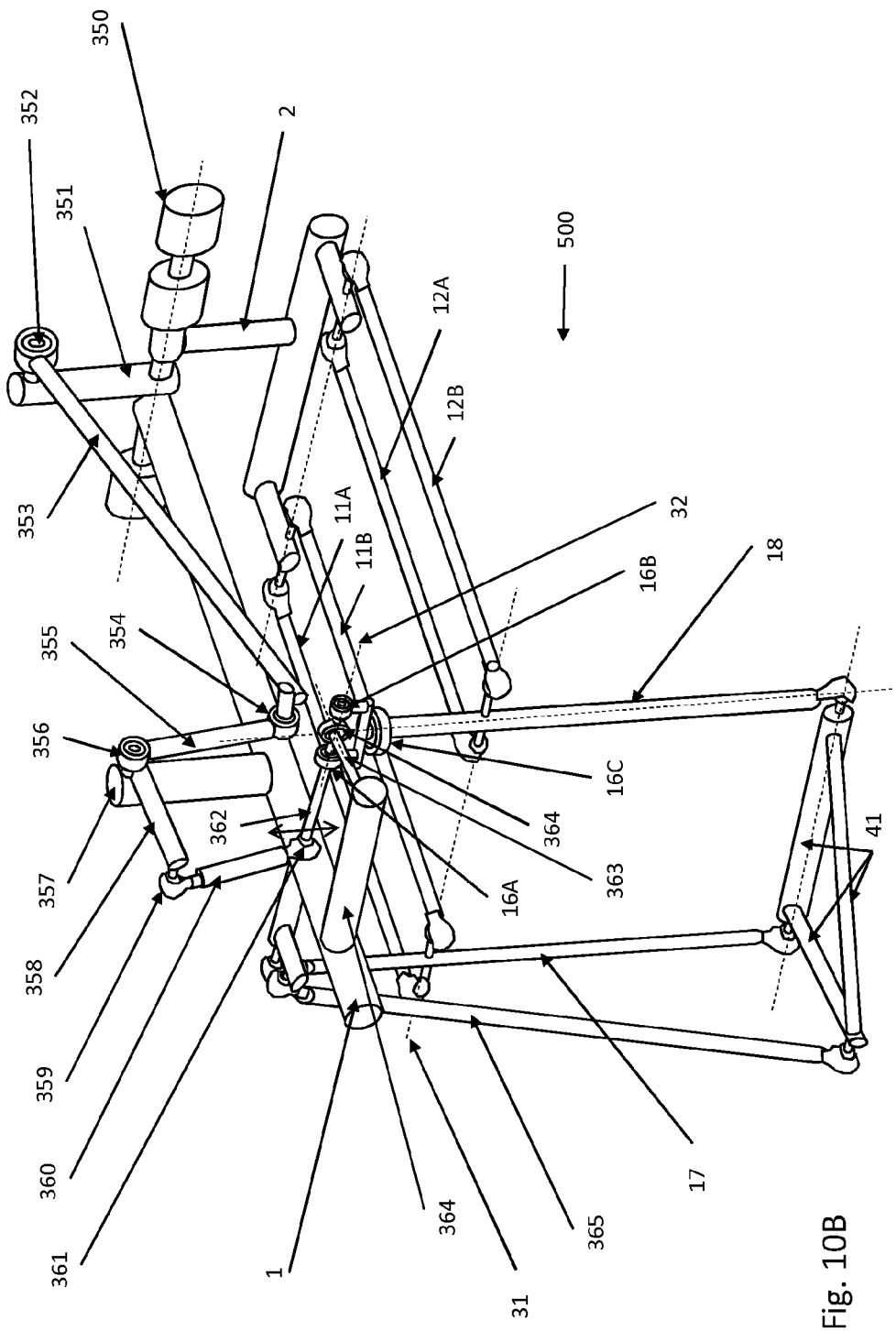

As understood from the disclosure, in some embodiments, the robot arm comprises a plurality of orientation linkages 52, 57, 59; 202, 204, 207, 209; 251, 256, 258. Each orientation linkage has a connected orientation transmission 64B, 64A, 216; 64C, 64D, 64E; 100, 64A; 260, 262, 264, 266, 271, 270, respectively. The plurality of orientation linkages is configured such that each corresponding end-effector orientation is accomplished for one or several end-effectors that are arranged onto the end-effector platform FIGS. 10A, 10B illustrate a robot arm 500 according to a seventh embodiment, with a horizontal common first axis of rotation 29 of the rotary actuators. The robot arm 500 is divided into FIGS. 10A and 10B to make the understanding of the kinematic structures easier. Thus, FIG. 10A shows the complete robot structure with the kinematic chain to control the tilting angle of the tool 28. In this case the tool 28 is rotated by a lightweight rotating actuator 390, mounted on the horizontal shaft 65 connected to the gear wheel 61B. The gear wheel 61B is engaged by the gear wheel 64B, mounted on the shaft 213, which is connected via the bearing 214 to the end-effector beam 41A. The end-effector beam 41A is in this case part of an end-effector platform 41 including the elements 366 together with the beam 68 which is hollow, in which the shaft 65 is mounted with one bearing in each end of the hollow beam 68. The end-effector platform 41 including the elements 366 forms a rigid framework with rods mounted together to give support to the joints 367, 368 and 369, the bearing 214 and the shaft 65. The shaft 213 is rotated by a lever 61, which is connected to the end-effector rotation link 59 by a ball- and socket joint 60. The end-effector rotation link 59 is arranged to be moved up and down by a lever 257, which is connected to the end-effector rotation link 59 via a ball-and socket joint 58. The lever 257 is arranged to be rotated to swing up and down by the shaft 52, which is mounted on the bearings 53 and 55, which in turn are mounted on the inner arm-assemblage 1 with the beams 53 and 56. The shaft 52 is arranged to be rotated by the rotating actuator 50 via the 90 degrees angle gear 51.

In this design shown in FIGS. 10A, 10B, the constraint on the tilting degree of freedom around the axis center of the end-effector beam 41A is obtained by a third link 365, connected to the end-effector platform 41 with the ball-and socket joint 367A and to the inner arm-assemblage 1 with the ball- and socket joint 367B. The first link 17 is connected to the end-effector platform 41 with the joint 368 and to the inner arm-assemblage 1 with the joint 15 and link 18 is connected to the end-effector platform 41 with the joint 369. As can be seen in FIG. 7B, where the transmission for the control of the tilting angle has been removed for clarity, the upper end of the actuating link 18 of the outer pair of links is connected via the bearing 16C to the bearing pair 16A and 16B. The rotation center of the bearing 16C coincides with the axis center of the actuating link 18. The bearings 16A and 16B are mounted on the bearing 364 in such a way that the rotation axes of the bearings 16A and 16B coincide and are at a right angle to the rotation angle of the bearing 363. The bearing 363 is mounted on the shaft 363, which in turn is mounted on the inner arm-assemblage 1 via the beam 364. Now the lever 362 in the center of bearing 16A and connected to the outer ring of the bearing 363 is used to swing the bearing pair 16A, 16B around the bearing 363 and as a result the actuating link 18 will swing around the lever 362, which is parallel with the center of the hollow link of the inner arm-assemblage 1. The shaft 363 is actuated to swing up and down by the link 360, which has ball- and socket joints 359 and 361 in each end. The joint 359 is connected to the lever 358, mounted on the outer ring of the bearing 356. The inner ring of the bearing 356 is mounted on the beam 357, in turn mounted on the inner arm-assemblage 1. Another lever 355 is mounted on the outer ring of the bearing 356 in a direction which is about 90 degrees relative the lever 358. The lever 355 is connected to the link 353 via the bearing 354, which could actually also be a ball-and socket joint. The other end of the link 353 is connected to the lever 351 via the bearing 352. The bearing 352 can also be replaced by a ball- and socket joint. The lever 351 is forced to swing by a rotating actuator 350. In some applications this transmission to swing the link 18 is better than the using the first rotating shaft 3 as in previous figures. Examples are when the inner arm-assemblage 1 is very long and it is easier to obtain stiffness in a link 353 with only axial force instead of a shaft 3 with rotational torque.

Another new feature introduced in these figures is to use pairs of links 11A, 11B and 12A, 12B instead of single links 11 and 12 as in the previous figures. This makes it possible to use simple pairs of ball- and socket joints, which are kept together with springs between the links in the link pairs. Thus, the link system here comprises a third link 365, the inner arm-linkage comprises a pair of parallel pairs of parallel links 11A, 11B and 12A, 12B and the actuation of the tilting angle of the tool 28 is now made via a link 353 which takes only axial forces. In other words, the links of the inner arm-linkage (the inner pair of parallel links 11, 12) comprises pairs of parallel links 11A, 11B; 12A, 12B and these pairs of parallel links 11A, 11B; 12A, 12B are mounted with ball- and socket joints on each side of the links of the outer arm-linkage.

Figure 11:
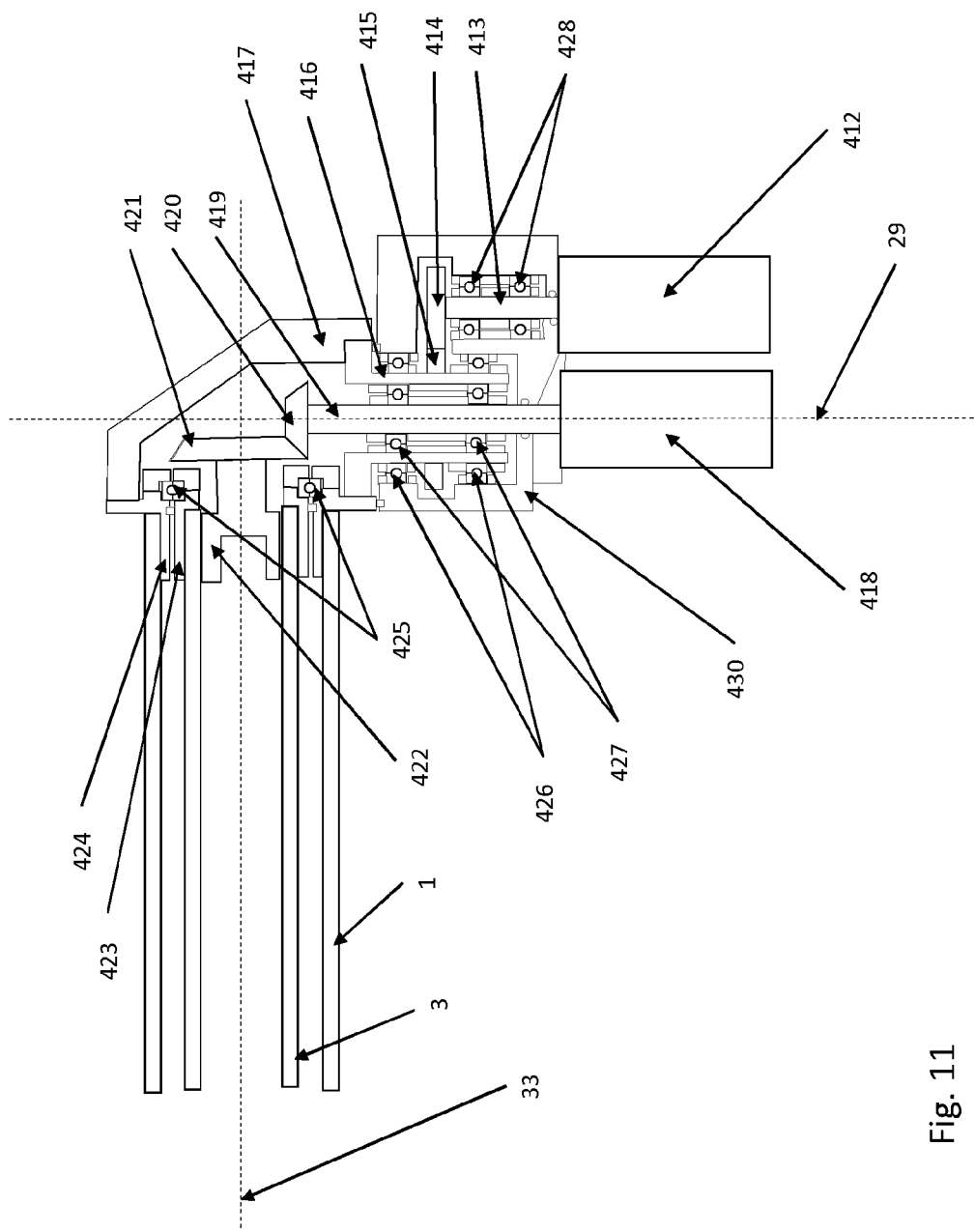
FIG. 11 illustrates an embodiment where the rotary actuators are arranged to obtain a common rotation axis without using hollow shaft motors as illustrated in FIGS. 1-6.

In the previous figures, hollow shaft actuators have been outlined to make the figures easier to understand. FIG. 11 shows how the actuation could instead be made with standard motors without hollow shafts. FIG. 11 is a cut of two actuators driving the hollow link 1A and the rotary shaft 3. Both the hollow link 1A and shaft 3 are tubes, for example manufactured in carbon reinforced epoxy. Hollow link 1A is mounted on the outside of the ring 424, which is assembled together with the housing 417. This housing is mounted on the shaft 416, which is rotated by the motor 412 via the shaft 413 and the gear wheels 414 and 415. The gear wheel 415 is mounted directly on the outer surface of shaft 416 and the gear wheel 414 is mounted at the end of the shaft 413. The shaft 413 is equipped with the bearing pair 428 between the gear housing 430 and the shaft 413. In the same way, the shaft 416 is equipped with the bearing pair 426 between the gear housing 430 and the shaft 416.

The shaft 3 is mounted between the inner short shaft 422 and the outer ring 423. The outer ring is in turn mounted in the housing 417 via the bearing 425 to support the rotation of shaft 3. In the other end shaft 3 will be mounted with a corresponding bearing on the inside of the hollow link 1A of the inner arm-assemblage 1. A 90 degrees gear wheel 421 is mounted on the short shaft 422. The gear wheel 421 is driven by the 90 degrees gear wheel 420, mounted on the shaft 419, which is driven by the motor 418. The shaft 419 is supported by the bearing pair 427 between shafts 416 and 419. The first axis of rotation 29 (compare previous figures) is defined by the rotation center of bearing 425 and the corresponding rotation center of the bearing in the other end of shaft 3. The first axis of rotation 29 (also shown in previous figures) is defined by the rotation center of shaft 419. Thus, FIG. 11 illustrates an embodiment where the rotary actuators are arranged to obtain a common rotation axis without using hollow shaft motors as illustrated in FIGS. 1-6. The motors 412, 418 are mounted beside each other and hollow shaft 416 gears 414, 415 are used.

Figure 12A:
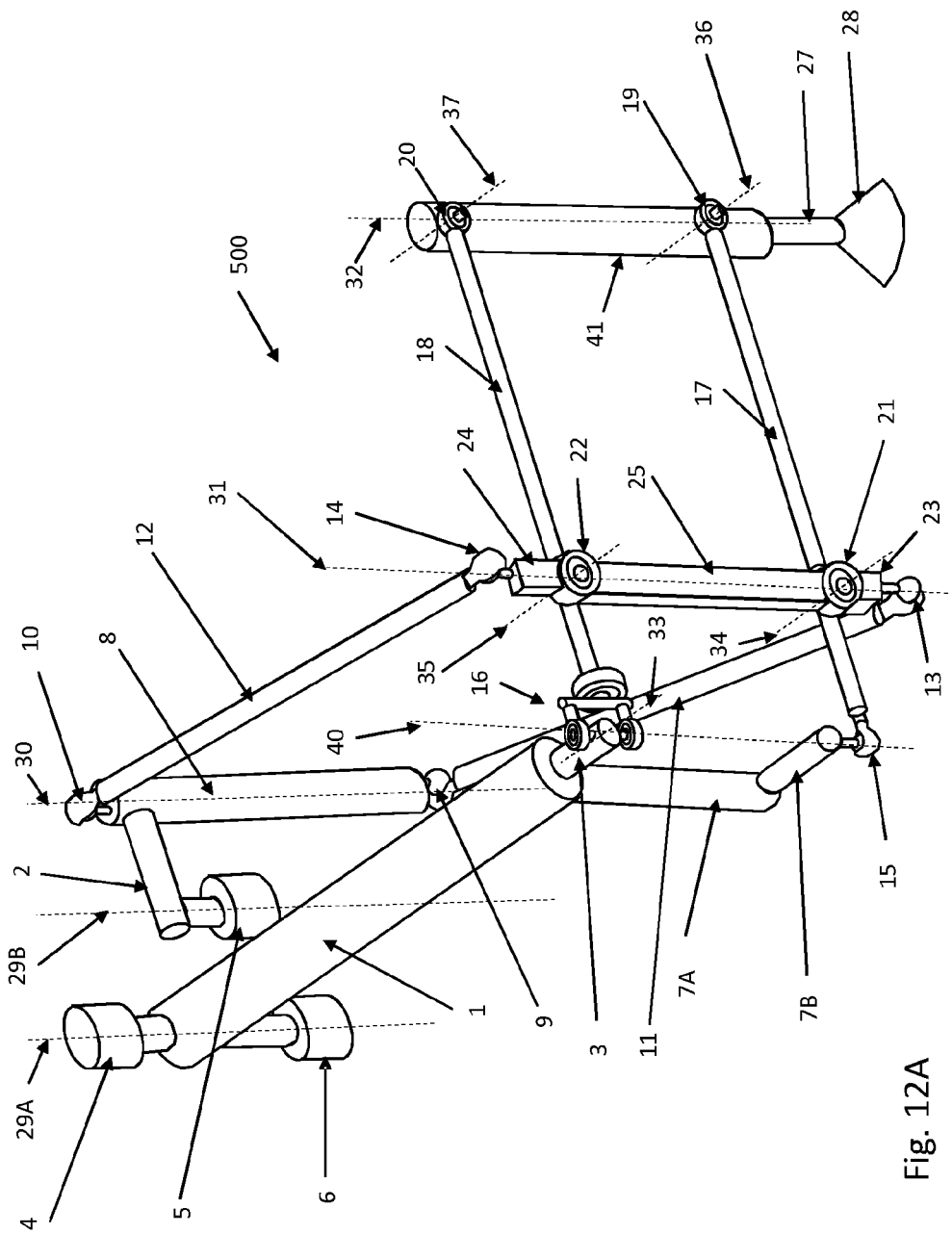
FIG. 12A illustrates an alternative main structure of the industrial robot arm of FIG. 2A.

FIG. 12A illustrates an alternative version of FIG. 1, where the first axis of rotation 29 of the actuators has been split into two different parallel rotation axes 29A and 29B. In this way no hollow shaft actuator is needed. Here the second actuator 5 is moved to have its own rotation axis 29B and as before it is arranged to swing the lever 2 in order to move the parallel links 11 and 12. The first actuator 4 and the third actuator 6 have a common rotation axis 29A. The first actuator 4 is mounted directly on the inner arm-assemblage 1 and the third actuator 6 is connected to a right-angle gear not seen in the figure, to rotate the shaft 3. Simultaneously with the advantage that the actuator arrangement will be simpler, there will be the drawback that the workspace will be somewhat reduced and the force transmission in the links 11 and 12 will depend on the rotation angle of the inner arm-assemblage 1. In the figures with more than three actuators it will of course also be possible to have parallel rotation axes between different actuators. For further description of FIG. 12A, reference is made to the description of FIG. 1.

Figure 12B:
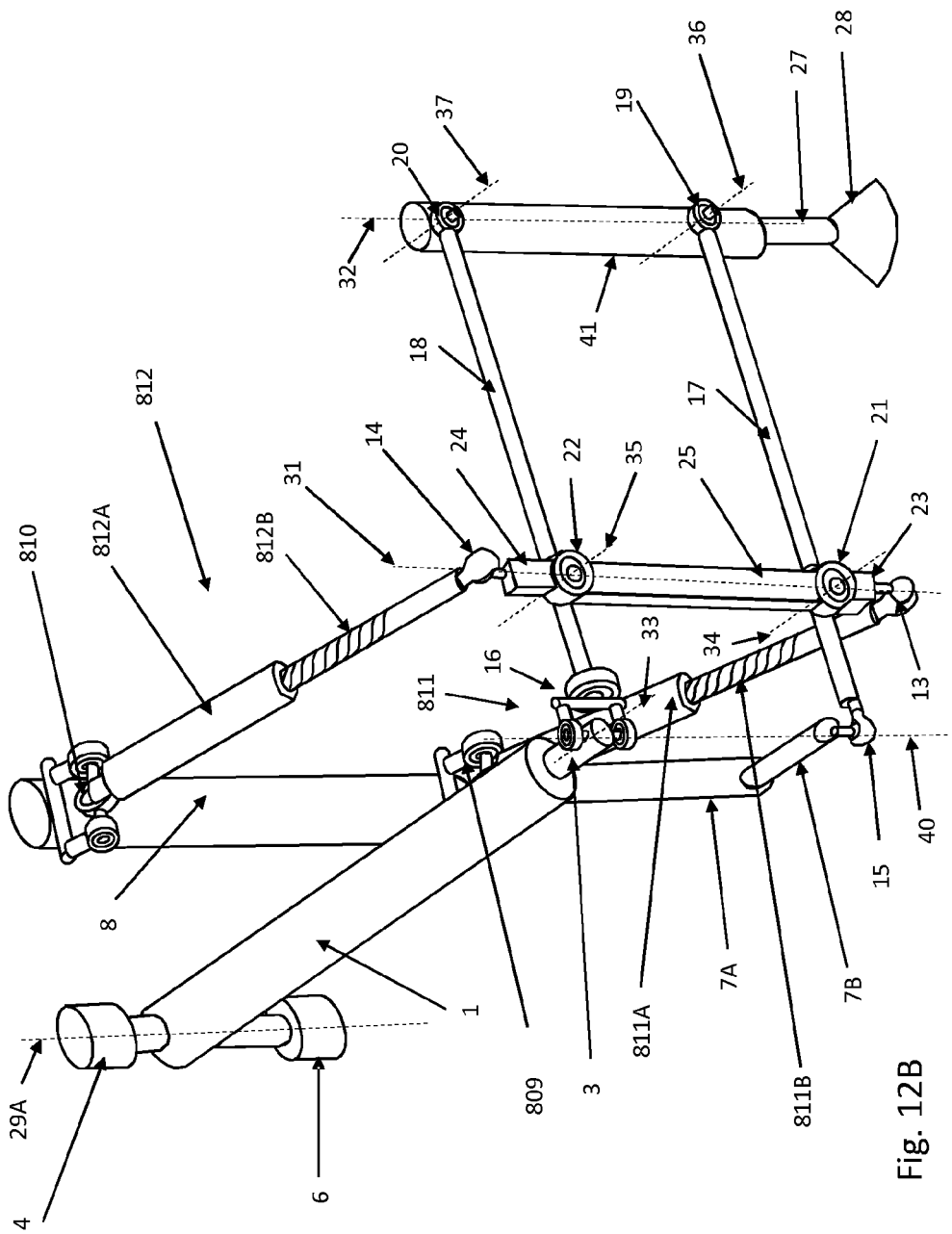
FIG. 12B illustrates how linear actuators can be used, in this case in a linkage without having a lever present as in FIG. 12A.

FIG. 12B illustrates that instead of an actuator (here the actuator 5) consisting of a rotational motor, possible a gearbox on the output motor shaft, and a lever (here the lever 2) that delivers the desired motion for actuating each respective kinematic chain as in FIG. 12A, the desired motion of link ends can be accomplished directly by a linear actuator. The function (to move joints 13 and 14) of the two links 11 and 12 in FIG. 12A is accomplished by two ball-screws 811 and 812 that end at joints 13 and 14 respectively, thereby providing the function of links 11 and 12. The ball-screws 811 and 812 are in the other end connected to the beam 8, here via universal joints 809 and 810, which have the same function as joints 9 and 10 but for best function of the ball-screws not permitting rotation around each respective link 811 and 812. Each ball-screw comprises a ball-nut part 811A, 812A that is rotationally fixed to its base end at 809, 810, and it is also rotationally fixed relative to the screw part 811B, 812B as needed to accomplish the linear motion, which is from the screw 811B, 812B extending from the ball-screw part 811A, 812A, thereby making the link 811 and 812 shorter or longer. Here, the actuator 5 is duplicated and built into or attached to both 811A and 812A such that the screw 811B, 812B turns. Here actuator 5 (FIG. 12A) is integrated into 811A and 812A and hence not visible in the figure. In FIG. 12A the single actuator 5 and lever 2 moves the beam 8, but in FIG. 12B the two ball-screw each have one actuator, and hence they have to move synchronized (by means of the mentioned control system) to keep the axes 30 and 31 parallel. An alternative embodiment would be to have the lever 2 rotating about axis 29B but without the actuator 5, and instead have a ball-screw acting from a location near centerline 29A to the beam 8. This way, only one ball-screw would be needed. The ball-screws may also act from a location (not shown) on the hollow link 1A, then not propagating the forces to the robot stand.

In general, another way of using linear actuators is to use them with a lever to create a limited-range rotation. Specifically, it applies to all of the rotations exhibited by all actuators in all enclosed figures except FIGS. 6A, 6B and 12B, that motions are created by a rotational actuator, which normally according to existing robot practice has an unlimited rotational capability. With the disclosed robot arm, however, except the plurality of wrist motions in FIGS. 6A and 6B, there is no need to have large-range actuators. Instead, according to the present invention, each actuator can be linear, arranged with suitable levers. Hence, apart from ball-screws, actuators can be pneumatic or hydraulic too, for very low robot cost or for very high end-effector forces respectively.

A transmission as used herein may be a gear transmission such as traditional pinion-pinion or rack-pinion with actual gears but may be replaced by other transmissions, which may be based on wires or belts of equivalent function for either pinion-pinion or rack-pinion gear transmissions. As used herein, the term "transmission" means any transmission of similar functionality as the types of gear transmissions mentioned above.

Figure 13:
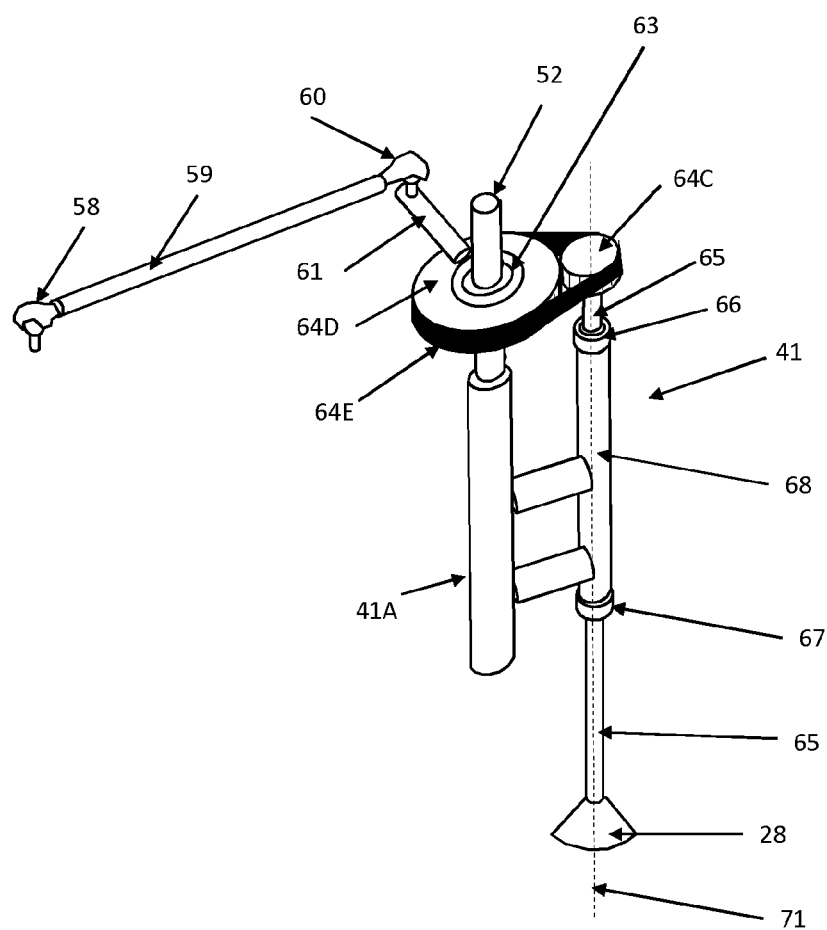
FIG. 13 illustrates an alternative transmission.

FIG. 13 shows parts of the transmission for end-effector rotation of FIGS. 1 and 3A, but here the gears 64A and 64B have been replaced by belt wheels 64C and 64D connected to the belt 64E. For further description of the components in the FIG. 13, reference is made to the description of FIGS. 1, 3-3D. A belt transmission can sometimes be made with simpler mechanics than a gear transmission. Moreover, if the transmission is made in plastic material, a cheap belt transmission may have a longer life time than gear wheels made in plastic.

Figure 14A:
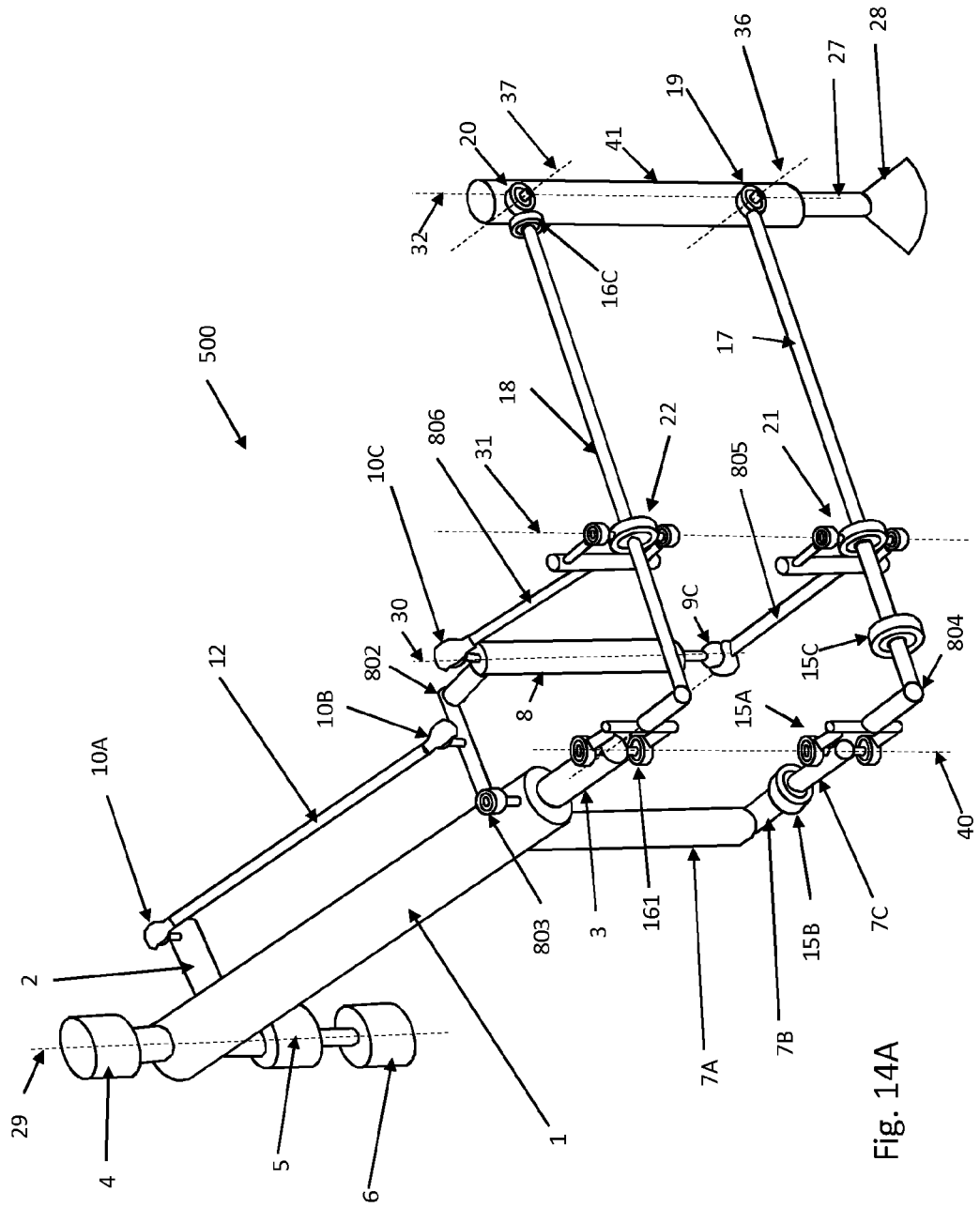
FIG. 14A illustrates variations of joint types, permitted joint offsets, and a backhoe mechanism as part of a second kinematic chain.
Figure 14B:
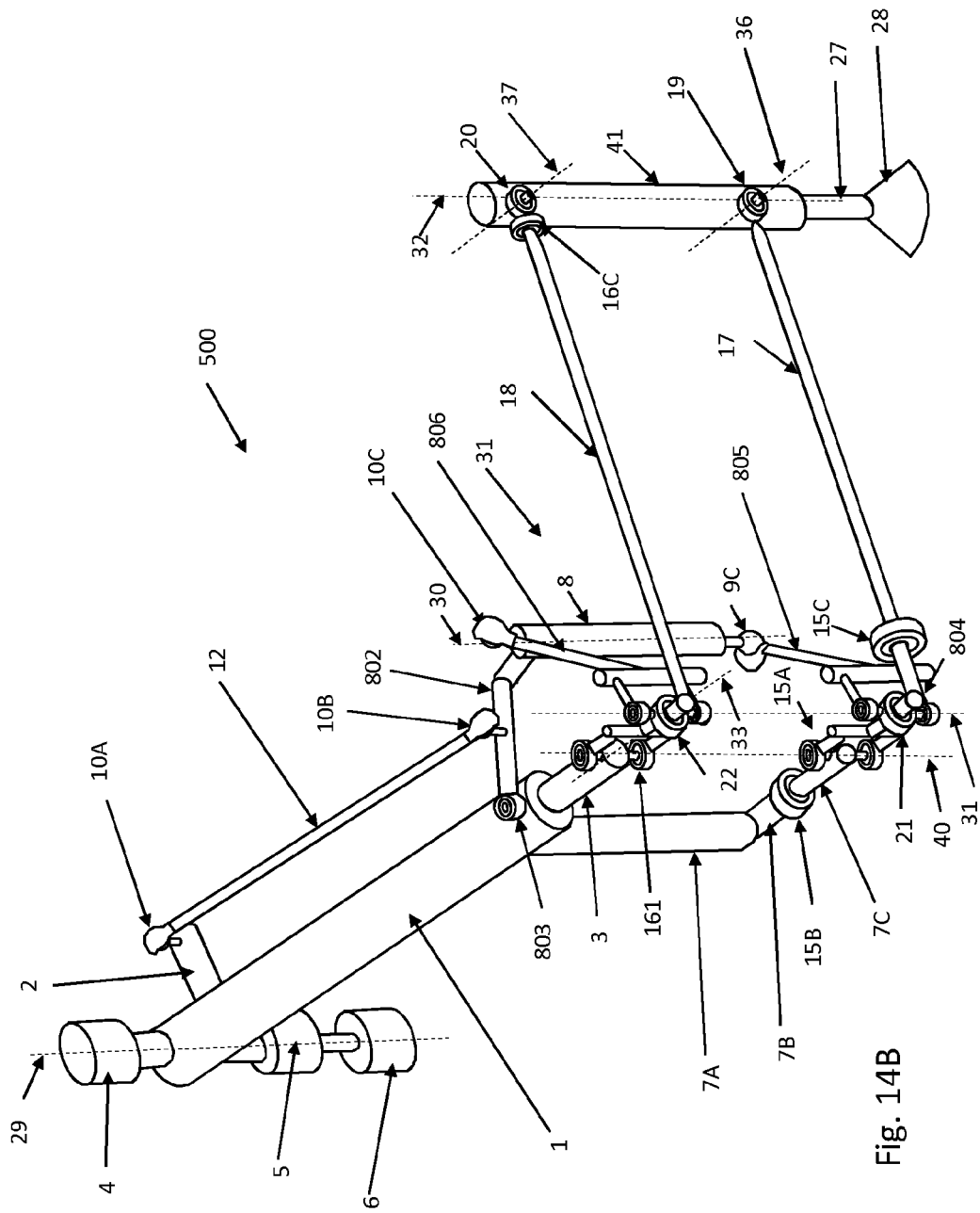
FIG. 14B illustrates an alternative backhoe configuration that radically increases the workspace of the robot arm.

FIGS. 14A and 14B explains the use of the backhoe mechanism (see FIG. 4B) for the second kinematic chain, according to some embodiments. FIG. 14A first illustrates the backhoe as such with the connection bearings still placed around the rotational centerlines of the two links of the outer pair of parallel links 17, 18. The base bearing 803 of the backhoe is placed on part 1A of the inner arm-assemblage 1, which means that the backhoe can operate via two links 805, 806 and universal joints 21, 22 as in FIG. 3A. Placing the bearing 803 on shaft 3 for a more preferable direction of forces over the connection bearings would require another way of keeping the rotational axes 31 and 32 parallel to axis 33, for example by introducing an additional joint between 8 and 802 and an additional link between 8 and 7C (this is not shown in the figures). The motivation for the backhoe is to increase the working range of the second kinematic chain, and thereby the workspace for the robot arm 500. In particular, most SCARA robots have a working range of more than 180 degrees for the second DOF. The robot design according to WO2014187486, on the other hand, is limited by the parallelograms it is based on for the inner and outer arm linkages, and not capable of operation within a desired 180 degree range. The backhoe (introduced in FIG. 4B) can solve this problem, thereby forming a differentiating feature in relation to WO2014187486.

The backhoe as applied as in FIG. 14A shows the basic principle with the beam 8 now placed closer to the elbow, now with rotating with a lever 802 around bearing 803 such that actuating forces over joints 9C and 10C are better directed as the arm is stretched out with increasing angles around the second axis of rotation 40 that intersects with the elbow joint 161. This provides some increase of workspace, at least considering capabilities for end-effector forces in the direction of axis 33, but it does not reach a competitive working range since a stretched-out arm will reach singularities with the outer pair of parallel links flipping around their axis of rotation as allowed by bearings 15C and 16C. Note that bearings 15A, 15B, 15C together are equivalent to joint 15 in earlier figures. That is, the link part 804 is not the problem concerning the flipping; joint 15 is separated into single-DOF joints as an illustrative preparation for the solution as illustrated in FIG. 14B.

In FIG. 14B the backhoe is configured to act on the outer pair of parallel links via the connection bearings 21, 22 being placed on the offset part of the out arm-linkage. That is, the connection bearings with their common rotational axis 31 no longer intersects with the rotational axis of the outer par of parallel links 17, 18. Instead, the connection bearings are each placed such that their inner bearing (as inner to bearing 21A in FIG. 3D) rotate around an axis that intersects with the second axis of rotation 40. This design, with proper dimension of the mentioned offset compared to link lengths, as the skilled person will easily determine (finding that the offset—being the distance between axis 40 along axis 33 until intersecting with the rotational axis of the actuating link 18—shall be at least the length of the actuating link times sine of the maximum angle of the outer arm linkage relative a plane with normal direction parallel to axis 40). With a proper offset (such as the length of the actuating link 18 times sin(x) where x is the maximum allowed rotation of the outer arm linkage relative a plane with normal direction parallel to axis 40), singularities will be outside the workspace (with the permitted range in z-direction agreeing with the maximum allowed x as to be configured in the control system), and the second kinematic chain can operate past the most outstretched position of the outer arm-linkage.

The present disclosure is not limited to the above-described embodiments. Various alternatives, modifications and equivalents may be used. Principles shown in the different figures can of course be combined, not only for the specifically illustrated kinematic chain or embodiment, but also at other parts of the arm structure wherever applicable and apparent for the skilled person. Therefore, the above embodiments should not be taken as limiting the scope of the invention, which is defined by the appending claims.

The invention claimed is:

1. A robot arm for end-effector motion, comprising:
a first actuator configured to rotate an inner arm-assemblage about a first axis of rotation, the inner arm-assemblage being connected to an outer arm-linkage pivotably arranged around a second axis of rotation, the outer arm-linkage being connected to an end-effector platform, thereby forming a first kinematic chain from the first actuator to the end-effector platform that provides a first degree of freedom for positioning the end-effector platform;
a second actuator configured to rotate the outer arm-linkage around the second axis of rotation, thereby forming a second kinematic chain from the second actuator to the end-effector platform that provides a second degree of freedom for positioning the end-effector platform;
a third actuator configured to rotate a shaft around a third axis of rotation such that the outer arm-linkage is rotated via a joint, thereby forming a third kinematic chain from the third actuator to the end-effector platform that provides a third degree of freedom for positioning the end-effector platform; and
a fourth actuator and a fourth kinematic chain configured to transmit a movement of the fourth actuator to a corresponding orientation axis for an end-effector, the fourth kinematic chain comprising:
an orientation linkage mounted to the inner arm-assemblage via at least one bearing; and
an orientation transmission mounted to the end-effector platform, wherein the orientation linkage comprises an end-effector rotation link and a plurality of joints that provide at least two degrees of freedom for motion of each end-joint of the end-effector rotation link.

2. The robot arm according to claim 1, where the orientation transmission comprises a connection to the end-effector, thereby providing at least four degrees of freedom for motion of the end-effector.

3. The robot arm according to claim 1, where the orientation transmission comprises at least one outer gearing mechanism having a first gear ratio and arranged for rotating the end-effector within an angular range that is determined by the first gear ratio of the outer gearing mechanism.

4. The robot arm according claim 1, where the orientation linkage comprises at least one inner gearing mechanism having a second gear ratio and arranged for rotating the end-effector within an angular range that is determined by the second gear ratio of the inner gearing mechanism without being limited by the rotation of the outer arm-linkage.

5. The robot arm according to claim 1, where the orientation linkage and the orientation transmission are arranged for rotating the end-effector around the orientation axis without rotational angular limits.

6. The robot arm according to claim 5, further comprising a plurality of orientation linkages, each of the orientation linkages comprising an orientation transmission, wherein the plurality of orientation linkages is configured such that a corresponding plurality of concentric output shafts is operable to actuate several end-effector orientations for at least one end-effector arranged onto the end-effector platform.

7. The robot arm according to claim 1, wherein the second kinematic chain comprises the inner arm-linkage including at least one link connected to the outer-arm linkage via a plurality of connection bearings, and wherein the second actuator is configured to move the at least one link via at least one inner connection joint connected to the at least one link.

8. The robot arm according to claim 7, wherein the outer arm-linkage comprises an outer pair of parallel links connected to the end-effector platform, wherein the inner arm-linkage comprises an inner pair of parallel links that are connected to the outer pair of parallel links of the outer arm-linkage, and wherein the second kinematic chain is configured to transmit rotation of a lever to a corresponding movement of the end-effector platform.

9. The robot arm according to claim 8, wherein the outer pair of parallel links and the inner pair of parallel links are connected by a connection bearing for each link connection of the respective links, and wherein each of the connection bearings has a rotation axis at a right angle to an axial centerline of each respective link of the outer pair of parallel links.

10. The robot arm according to claim 9, further comprising a rigid beam connecting the connection bearings to each other.

11. The robot arm according to claim 10, where the inner pair of parallel links is mounted via ball-and-socket joints on offset beams to the rigid beam.

12. The robot arm according to claim 8, wherein the third kinematic chain comprises an inner transmission connected between the third actuator and an actuating link of the outer pair of parallel links.

13. The robot arm according to claim 8, further comprising a link bearing mounted along an actuating link of the outer pair of parallel links, wherein the link bearing has an axis of rotation that coincides with a center of the actuating link of the outer pair of parallel links.

14. The robot arm according to claim 8, further comprising an end-effector bearing connecting each of the outer pair of parallel links to the end-effector platform, wherein each of the end effector bearings has a rotation axis that is perpendicular to a center of one of the outer pair of parallel links.

15. The robot arm according to claim 14, wherein each of the connection bearings has a rotation axis, and wherein the rotation axes of the end-effector bearings are parallel with the rotation axes of the connection bearings.

16. The robot arm according to claim 8, further comprising a connection bearing connecting each of the links of the outer pair of parallel links to each of the links of the inner pair of parallel links, wherein a rotation axis of each connection bearing coincides with a center of the respective link of the outer pair of parallel links.

17. The robot arm according to claim 8, wherein each of the links of the inner pair of parallel links comprises a pair of parallel links mounted with ball-and-socket joints on each side of the links of the outer pair of parallel links.

18. The robot arm according to claim 1, wherein the inner arm-assemblage comprises a hollow arm link and the shaft mounted axially with bearings inside the hollow arm link, the shaft being rotatable by the third actuator.

19. The robot arm according to claim 1, wherein the fourth kinematic chain comprises a plurality of orientation linkages each connected to an orientation transmission, wherein each of the orientation linkages and its connected orientation transmission is configured such that a corresponding end-effector orientation is accomplished for at least one end-effector arranged onto the end-effector platform.

20. The robot arm according to claim 1, further comprising at least two orientation transmissions mounted to the end-effector platform, and wherein an outer gearing mechanism of one of the at least two orientation transmissions is arranged to rotate at least the other one of the at least two orientation transmissions.

21. The robot arm according to claim 1, further comprising a fifth actuator and a fifth kinematic chain configured to transmit a movement of the fifth actuator to a corresponding movement of the end-effector arranged onto the end-effector platform via at least one other orientation transmission.

22. The robot arm according to claim 1, comprising at least one further actuator and at least one further kinematic chain configured to transmit a movement of the at least one further actuator to a respective movement of the end-effector arranged onto the end-effector platform, thereby providing at least six degrees of freedom for motion of the end-effector.

* * * * *